US007233947B2

(12) United States Patent
Lomet

(10) Patent No.: US 7,233,947 B2
(45) Date of Patent: *Jun. 19, 2007

(54) TIMESTAMPING IN DATABASES

(75) Inventor: David Bruce Lomet, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 344 days.

This patent is subject to a terminal disclaimer.

(21) Appl. No.: 10/444,009

(22) Filed: May 22, 2003

(65) Prior Publication Data

US 2004/0236746 A1 Nov. 25, 2004

(51) Int. Cl.
*G06F 17/30* (2006.01)

(52) U.S. Cl. ............................................. 707/8; 707/9
(58) Field of Classification Search ................ 707/2, 707/3, 8, 9, 10, 5, 202, 203, 10.1; 714/54
See application file for complete search history.

(56) References Cited

U.S. PATENT DOCUMENTS

| | | | | | |
|---|---|---|---|---|---|
| 5,317,731 | A | * | 5/1994 | Dias et al. ...................... 707/8 |
| 5,592,618 | A | * | 1/1997 | Micka et al. ................. 714/54 |
| 5,649,185 | A | * | 7/1997 | Antognini et al. ............. 707/9 |
| 5,682,527 | A | * | 10/1997 | Cooper et al. .............. 707/202 |
| 5,745,905 | A | * | 4/1998 | Larsson et al. ............. 707/203 |
| 5,835,908 | A | * | 11/1998 | Bennett et al. ............... 707/10 |
| 5,893,117 | A | * | 4/1999 | Wang ......................... 707/203 |
| 5,956,713 | A | * | 9/1999 | Bamford et al. ............... 707/8 |
| 6,032,145 | A | * | 2/2000 | Beall et al. ..................... 707/5 |
| 6,125,371 | A | * | 9/2000 | Bohannon et al. .......... 707/203 |
| 6,185,563 | B1 | * | 2/2001 | Hino ............................... 707/8 |
| 6,269,373 | B1 | * | 7/2001 | Apte et al. ..................... 707/10 |
| 6,324,534 | B1 | * | 11/2001 | Neal et al. ...................... 707/3 |
| 6,662,176 | B2 | * | 12/2003 | Brunet et al. ................... 707/2 |
| 6,754,657 | B2 | * | 6/2004 | Lomet ............................ 707/8 |
| 6,934,717 | B1 | * | 8/2005 | James ..................... 707/104.1 |

OTHER PUBLICATIONS

A-Jamah et al., "Implementation and modeling of two phase locking concurrently control- a performance study", information and software technology, vol. 42, Oct. 10, 1998.*

(Continued)

*Primary Examiner*—Jean M. Corrielus

(57) ABSTRACT

A method of assigning transaction timestamps for use with a database that includes temporal data and may include non-temporal data. In the method, a lock is placed on a resource accessed by a first transaction to prevent conflicts with concurrently executing transactions. An access record of the lock mode and a timestamp of the first transaction is created for the resource accessed by the first transaction. The access record is accessed to determine whether a resource that a subsequent transaction accesses conflicts with the resource accessed by the first transaction. A timestamp lower bound or floor is identified for the subsequent transaction when the subsequent transaction accesses a resource that conflicts with the resource access of the first transaction. A timestamp is assigned to the subsequent transaction that is greater than the lower bound. The access record of a lock mode and a transaction timestamp may be created each time a resource is accessed, may be created for resources accessed after a request for CURRENT TIME is made, and/or may be made for resources accessed after an end time of a time interval defined by a request for CURRENT TIME.

70 Claims, 16 Drawing Sheets

OTHER PUBLICATIONS

Barghouti et al., "Concurrency control in advanced database application", ACM, vol. 23, Issue 3, Sep. 1991.*

Menasce et al., "Performance evaluation of a two-phase commit based protocol for DDBs", ACM, Jun. 1982.*

"The consensus Glossary of Temporal Database Concepts"—Feb. 1998 Version, Christian S. Jensen et al., pp. 367-405.

"Using Timestamping to Optimize Two Phase Commit", David Lomet, Proceedings of the PDIS Conference, Jan. 1993, pp. 48-55.

"On the Semantics of 'Current-Time' in Temporal Databases", Marcelo Finger and Peter McBrien, pp. 324-337, In 11th Brazilian Symposium on Databases, 1996.

"The Design of the Postgres Storage System", Michael Stonebraker, Proceedings of the 13th VLDB Conference, Brighton, 1987, pp. 289-300.

"The Implementation of POSTGRES", Michael Stonebraker, Lawrence A. Rowe and Michael Hirohama, IEEE TKDE, vol. 2, No. 1, Mar. 1990, pp. 125-142.

"Effective Timestamping in Databases", Kristian Torp, Christian S. Jensen and Richard T. Snodgrass, VLDB Journal No. 8, 1999, pp. 267-288.

"Temporal and Real-Time Databases: A Survey", Gultekin Ozsoyoglu and Richard T. Snodgrass, IEEE TKDE, vol. 7, No. 4, Aug. 1995, pp. 513-532.

"Temporal Data Management", Christian S. Jensen and Richard T. Snodgrass, IEEE TKDE, vol. 11, No. 1, Jan./Feb. 1999, pp. 36-44.

"Implementation of Transaction and Concurrency Control Support in a Temporal DBMS", Costas Vassilakis, Nikos Lorentzos and Panagiotis Georgiadis, Information Systems, vol. 23, No. 5, pp. 335-350, 1998.

"On the Semantics of 'Now' in Databases", James Clifford et al., ACM TODS, vol. 22, No. 2, Jun. 1997, pp. 171-214.

"Concurrency Control and Recovery in Database Systems", Bernstein, Hadzilacos and Goodman, pp. preface iii-x, 1-112, 143-166, 178-179, 217-220 and 226-234, copyright 1987.

"Timestamping After Commit", by Betty Salzberg, pp. 160-167, dated 1994.

"Transaction Processing: Concepts and Techniques", by Jim Gray and Andreas Reuter, pp. 375-489, dated 1993.

Y. Wu, S. Jajodia and X.S. Wang, "Temporal Database Bibliography Update", 43 pages, 1998.

"Transaction Timestamping in (Temporal) Databases", Christian S. Jensen and David B. Lomet, VLDB 201, pp. 441-450.

"Granularity Hierarchies in Concurrency Control", Michael J. Carey, PODS 1983, pp. 156-165.

* cited by examiner

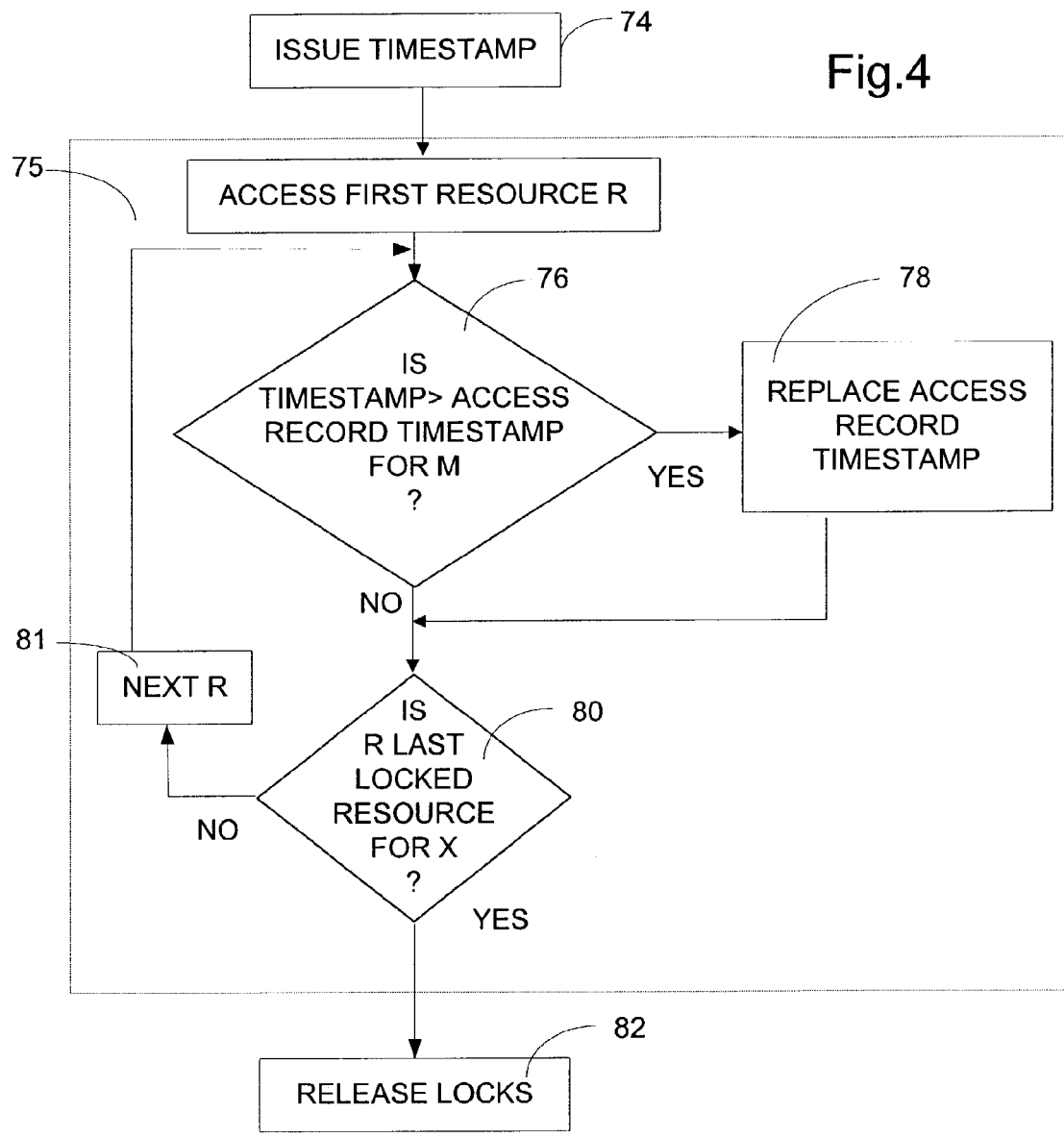

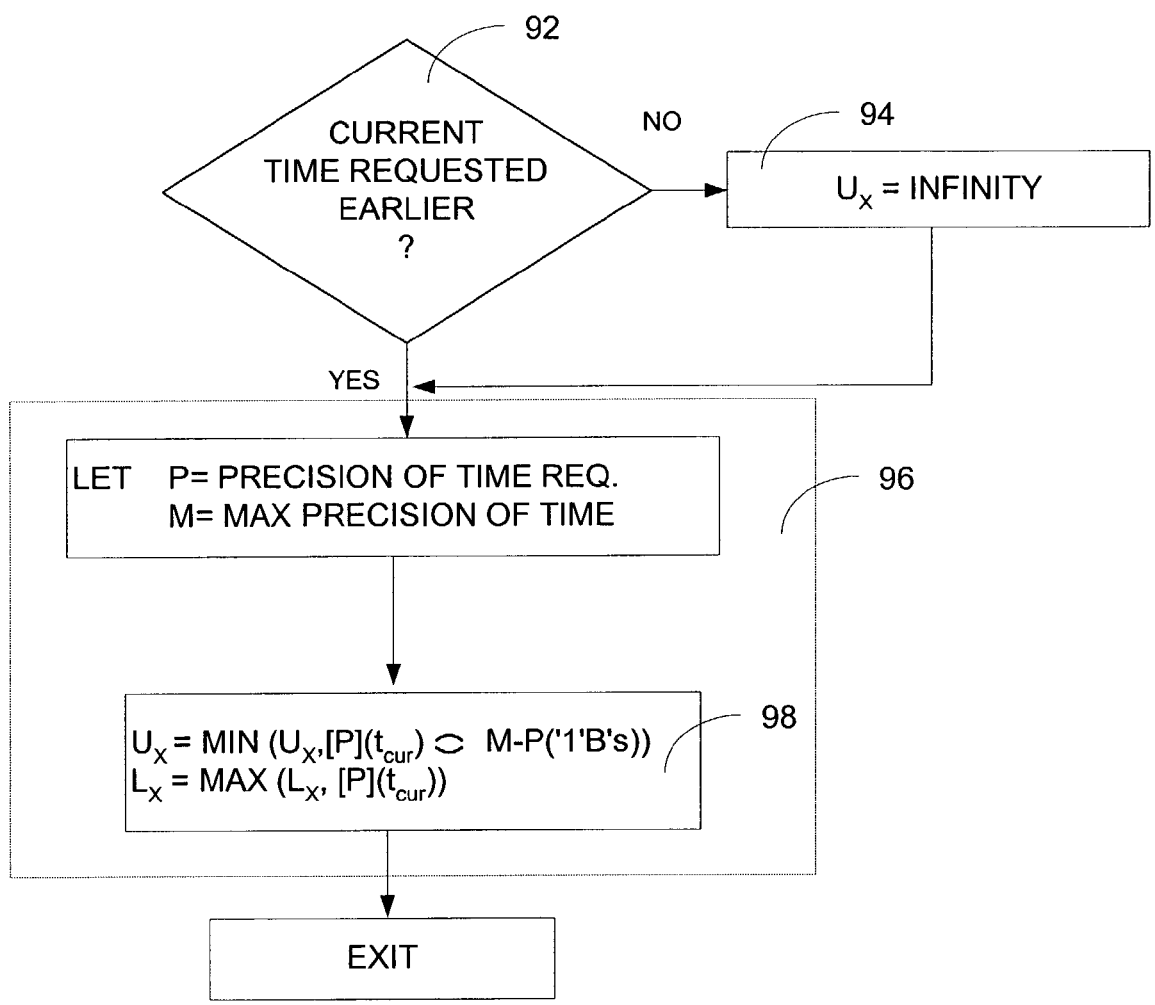

TIMESTAMPING IN DATABASES

FIELD OF THE INVENTION

The present disclosure concerns databases that include temporal data, and more particularly, the present disclosure relates to timestamping of temporal data in a database.

BACKGROUND ART

Conventional database relations contain sets of records. Insertions, updates and deletions of these records occur over time. In many applications, such as financial, banking, insurance, and medical applications it is desirable to maintain relations that contain not only the current set of records, but also a set of records that was current at any given past time. These relations are maintained in a form of a temporal database called a transaction-time database. Such a database supports queries of the form "give an answer AS OF some time in the past." In order to answer queries this type, the database needs to keep track of when changes occur in the database. This can be done by keeping track of the time at which transactions update individual records by timestamping the records. Each record version contains not only the record identification, but the timestamp of the transaction that caused the update that produced the version in question. "AS OF" queries for a time t are satisfied by searching for the versions of records with timestamps that are the largest timestamp for the record that is less than or equal to time t.

One existing approach to choosing timestamps is to delay timestamp choice until commit time. Using this approach, the time of commit can be used as the timestamp for the committing transaction. Since the commit order is consistent with transaction serialization order, the timestamp order will likewise be consistent with a serialization. One drawback of commit time timestamping is that commit time timestamping does not support transactions that request CURRENT TIME. This is because requests for CURRENT TIME can require that a timestamp be assigned that is earlier than commit time.

One solution that supports CURRENT TIME requests is disclosed in U.S. patent application Ser. No. 09/939,180 (hereinafter the '180 application), filed on Aug. 24, 2001, invented by David Lomet, assigned to the assignee of the present invention, and is incorporated herein by reference in its entirety. In the method disclosed by the '180 application, timestamps of data accessed during transaction execution are used to determine a lower bound on when a transaction could commit. An upper bound was derived from the CURRENT TIME request. So long as the interval between the lower bound and the upper bound is non-vacuous, the transaction could be committed and assigned a timestamp in the interval.

The solution disclosed by the '180 application is suited for the case where all data exists within a transaction time database. The time of last write for a record is stored as a timestamp in the record itself. This timestamp serves to identify the version of a record to be returned in a query that asks for data as of some particular time. The timestamp in the record enables the system to ensure that write-write and write-read conflicts were correctly reflected in the order of the timestamps, by requiring that the current transaction have a timestamp greater than the record's timestamp.

The '180 application also proposes keeping track of the last time that a record is read so that timestamps can be ordered consistent with read-write conflicts. The '180 application proposed a "read-timestamp table" (RTT) for this purpose. The '180 application suggested that the RTT did not have to retain information about every record, but could identify record classes by means of a hash function, used to index the table.

Existing solutions do not deal with situations where not all data resides in a transaction-time database. A solution is needed for timestamping that can work when ordinary data exists, and the ordinary data may or may not be accessed with the transaction time database data in the same transaction. Prior timestamping techniques also do not enforce timestamp order when locking detects phantoms that would result were a record to be written into ranges accessed by range queries. Prior timestamping techniques assign timestamps to individual records. However, assigning timestamps to individual records does not prevent a subsequent record from being written with a timestamp that is inconsistent with a previous range query.

There is a need for a timestamping technique that accommodates databases that include both temporal and non-temporal data. There is also a need for a timestamping technique that correctly orders timestamps when insertions conflict with range queries. There is also a need for such a timestamping technique that minimizes the overhead while correctly providing timestamps to transactions.

SUMMARY

The present disclosure concerns a method of assigning transaction timestamps for use with a database that includes temporal data and may include non-temporal data. In the method, a lock is placed on a resource accessed by a first transaction to prevent conflicting concurrent accesses with other transactions. The accessed resource may be a record, a range of records, a table, or a database page. Each such resource is locked in an appropriate mode when it is being accessed by a first uncommitted transaction. Such locking protects the resource from conflicting accesses of other transactions until this first uncommitted transaction commits. At that time, a timestamp is assigned to the transaction, and, when a resource locked by the transaction is a temporal database record, this timestamp is also stored with the record. Further, the method remembers the largest timestamp associated with each type of access to a resource in an access record. The access records of a resource are examined when the resource is accessed by a subsequent transaction, to determine whether that subsequent transaction access conflicts with the access by the first transaction or other earlier transaction. A timestamp lower bound or floor is identified for the subsequent transaction when the subsequent transaction access to the resource conflicts with the access of the first transaction. A timestamp is assigned to the subsequent transaction that is greater than the lower bound. In one embodiment, an access record of a lock mode and a transaction timestamp is updated each time a locked resource is unlocked at transaction commit.

In one embodiment, the disclosed method establishes an upper bound for a transaction's timestamp when CURRENT TIME or other time or date function is requested by a transaction. The timestamp upper bound is set to the latest time that is consistent with the result returned by the request for CURRENT TIME. A timestamp is assigned to each transaction that is less than or equal to its upper bound. In one embodiment, the timestamp of a transaction is set to the lesser of the commit time of the transaction and the upper bound defined by the CURRENT TIME request. A transaction is aborted should its lower bound or floor be greater than or equal to its upper bound.

In practice multiple previously created access records of locks and transaction timestamps may be accessed that potentially conflict with one or more resources accessed by the subsequent transaction. A lower bound or floor is identified for each resource accessed by the subsequent transaction. The largest lower bound identified for the resources accessed by the subsequent transaction is set as the lower bound for the timestamp for the subsequent transaction.

In one embodiment, the access records are overwritten by subsequent access records. For example, the access record (with lock and timestamp of the first transaction) for a resource accessed by the first transaction is replaced with an access record (with lock and timestamp of the subsequent transaction) when a resource accessed by the first transaction is accessed by the subsequent transaction. If more than one resource corresponds to an access record, the access record (with lock and timestamp of the first transaction for a resource accessed by the first transaction) is replaced with an access record (with lock and timestamp of the subsequent transaction) when a resource accessed by the subsequent transaction maps to the access record for a resource accessed by the first transaction.

The disclosed method can be used in databases that include temporal and non-temporal data. In addition, the disclosed method can be used to assign timestamps in a manner that prevents range queries from creating phantoms.

In one embodiment, the method delays creating and checking the access records of the locks and timestamps for accessed resources until current time is requested. In one embodiment, creating and checking of the access records is delayed until the current time is greater than the timestamp upper bound, which is the end time of the interval defined by the current time request. In one embodiment, creating and checking of the access records is stopped once no active transactions are requesting current time.

These and other objects, advantages, and features of an exemplary embodiment are described in conjunction with the accompanying drawings.

BRIEF DESCRIPTION OF THE DRAWINGS

FIG. 4 is a flowchart illustrating updating access records for committing transactions;

FIG. 6 is a flowchart illustrating processing of CURRENT TIME requests;

DETAILED DESCRIPTION

Exemplary Operating Environment

Figure 1:
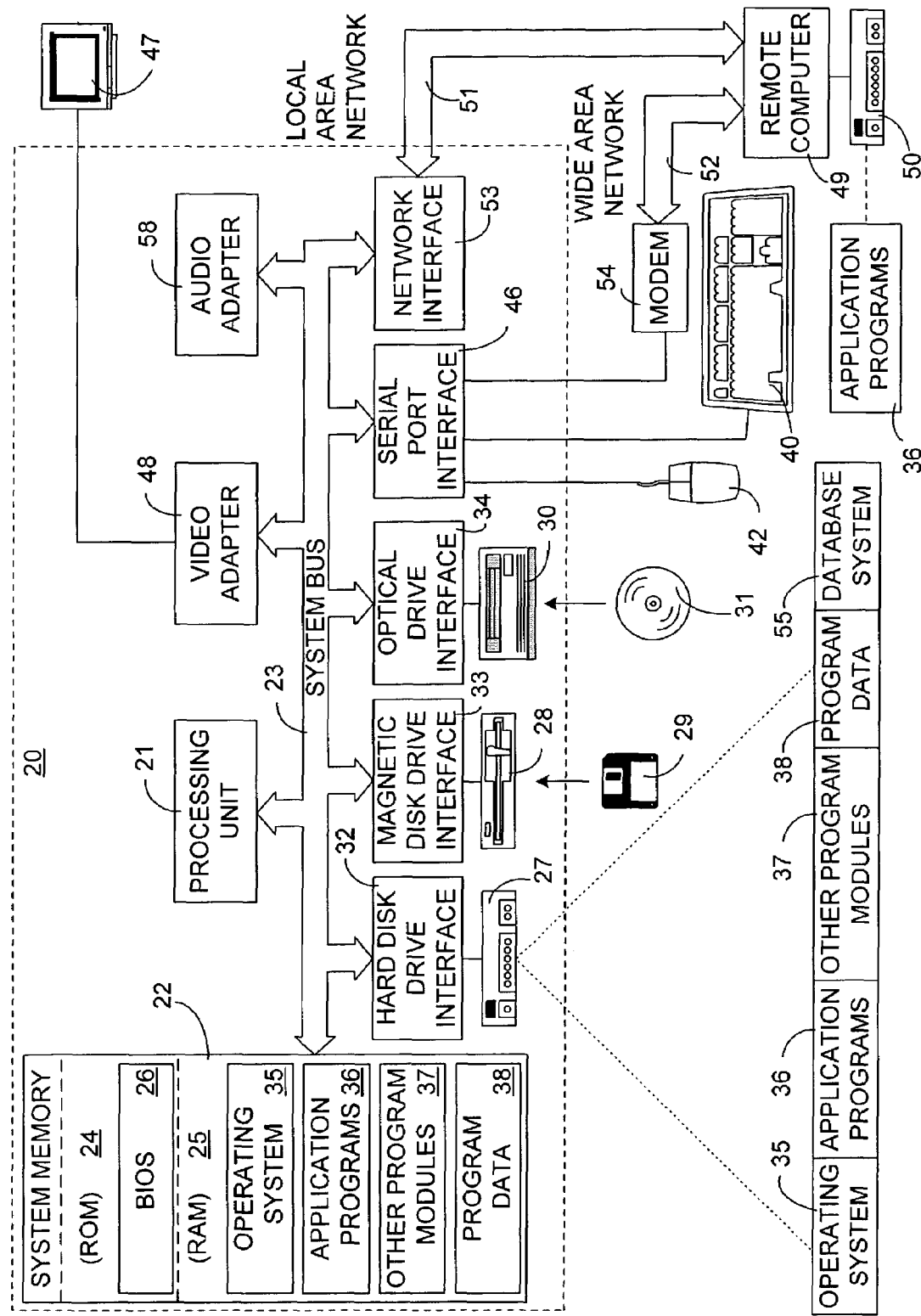
FIG. 1 is a schematic depiction of a computer system used in practicing an exemplary embodiment of the disclosed method.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 24 that couples various system components including system memory 22 to processing unit 21. System bus 23 may be any of several types of bus structures including a memory bus or memory controller, a peripheral bus, and a local bus using any of a variety of bus architectures. System memory 22 includes read only memory (ROM) 24 and random access memory (RAM) 25. A basic input/output system (BIOS) 26, containing the basic routines that help to transfer information between elements within personal computer 20, such as during start-up, is stored in ROM 24. Personal computer 20 further includes a hard disk drive 27 for reading from and writing to a hard disk, a magnetic disk drive 28 for reading from or writing to a removable magnetic disk 29 and an optical disk drive 30 for reading from or writing to a removable optical disk 31 such as a CD ROM or other optical media. Hard disk drive 27, magnetic disk drive 28, and optical disk drive 30 are connected to system bus 23 by a hard disk drive interface 32, a magnetic disk drive interface 33, and an optical drive interface 34, respectively. The drives and their associated computer-readable media provide nonvolatile storage of computer-readable instructions, data structures, program modules and other data for personal computer 20. Although the exemplary environment described herein employs a hard disk 27, a removable magnetic disk 29 and a removable optical disk 31, it should be appreciated by those skilled in the art that other types of computer-readable media which can store data that is accessible by computer, such as random access memories (RAMs), read only memories (ROMs), and the like may also be used in the exemplary operating environment.

A number of program modules may be stored on the hard disk 27, magnetic disk 29, optical disk 31, ROM 24 or RAM 25, including an operating system 35, one or more application programs 36, other program modules 37, and program data 38. A database system 55 may also be stored on the hard disk, magnetic disk 29, optical disk 31, ROM 24 or RAM 25. A user may enter commands and information into personal computer 20 through input devices such as a keyboard 40 and pointing device 42. Other input devices may include a microphone, joystick, game pad, satellite dish, scanner, or the like. These and other input devices are often connected to processing unit 21 through a serial port interface 46 that is coupled to system bus 23, but may be connected by other interfaces, such as a parallel port, game port or a universal serial bus (USB). A monitor 47 or other type of display device is also connected to system bus 23 via an interface, such as a video adapter 48. In addition to the monitor, personal computers typically include other peripheral output devices such as speakers and printers.

Personal computer 20 may operate in a networked environment using logical connections to one or more remote computers, such as a remote computer 49. Remote computer 49 may be another personal computer, a server, a router, a network PC, a peer device or other common network node, and typically includes many or all of the elements described above relative to personal computer 20, although only a memory storage device 50 has been illustrated in FIG. 1. The logical connections depicted in FIG. 1 include local area network (LAN) 51 and a wide area network (WAN) 52. Such networking environments are commonplace in offices, enterprise-wide computer networks, intranets, and the Internet.

When using a LAN networking environment, personal computer 20 is connected to local network 51 through a network interface or adapter 53. When used in a WAN networking environment, personal computer 20 typically includes a modem 54 or other means for establishing communication over wide area network 52, such as the Internet. Modem 54, which may be internal or external, is connected to system bus 23 via serial port interface 46. In a networked environment, program modules depicted relative to personal computer 20, or portions thereof, may be stored in remote memory storage device 50. It will be appreciated that the network connections shown are exemplary and other means of establishing a communications link between the computers may be used.

Overview of Timestamping Method

The present disclosure is directed to a method of assigning transaction timestamps in database system 55 that includes temporal data and/or non-temporal data. In the exemplary embodiment, the database system 55 includes a modified lock manager referred to herein as a timestamping lock manager TLM. The timestamping lock manager TLM performs two functions. First, the timestamping lock manager does the usual activity that lock managers do. That is, the timestamping lock manager blocks conflicting accesses of concurrently executing transactions. In doing that, the timestamping lock manager TLM forces the concurrently executing transactions to have what is called a serial schedule. Locks are placed on resources accessed by transactions to prevent conflicts with concurrent transactions so that the set of transactions will have a serial schedule, i.e. so that the changes produced by the set of transactions is the same as if each transaction was executed to completion before another transaction in the set was executed. That is, the result of executing concurrent transactions is as if they were executed sequentially or serially. Locks come in one of several possible lock "modes", only some of which conflict. For example, an exclusive mode lock conflicts with all other lock modes. But a shared lock mode does not conflict with other shared lock modes. Hence, two transactions can both simultaneously access a single resource in shared mode.

The second function of the disclosed timestamping lock manager TLM is ensuring that timestamps agree with some serial execution of the transactions. In the exemplary embodiment, the lock manager enforces such a serial schedule. So if conflicting accesses occur, and the method always assigns the transaction with the earlier access the earlier timestamp, the method will have correctly ordered the timestamps. In order to do this, the method remembers the timestamp given to the most recent access to a resource in each given lock mode. But note that what the method is remembering for the timestamps is not the access of concurrent transactions as such conflicting accesses are blocked by the lock manager. Rather, the method is remembering the conflicting accesses of transactions that are no longer holding locks because they have already committed.

In the exemplary embodiment, the conflicting accesses of transactions that no longer hold locks are remembered in what is referred to herein as an access record for a resource. The access record includes a timestamp and a lock mode. In the exemplary embodiment, this access record does not pertain to currently active transactions. Transactions are not given timestamps until they commit. So, except for timeslice queries, there is no timestamp to provide for the access record until a transaction has committed and given up all its locks. When a transaction commits, a previously blocked transaction with conflicting accesses now gains access to the blocked resource that it had locked. At this point, for this subsequent transaction, the timestamping lock manager can simultaneously lock the resources it accesses, and check the access record. This allows the method to determine the effect of accessing the resource on the lower bound for the timestamp that can be assigned to this subsequent transaction when this subsequent transaction finally commits.

Figure 3:
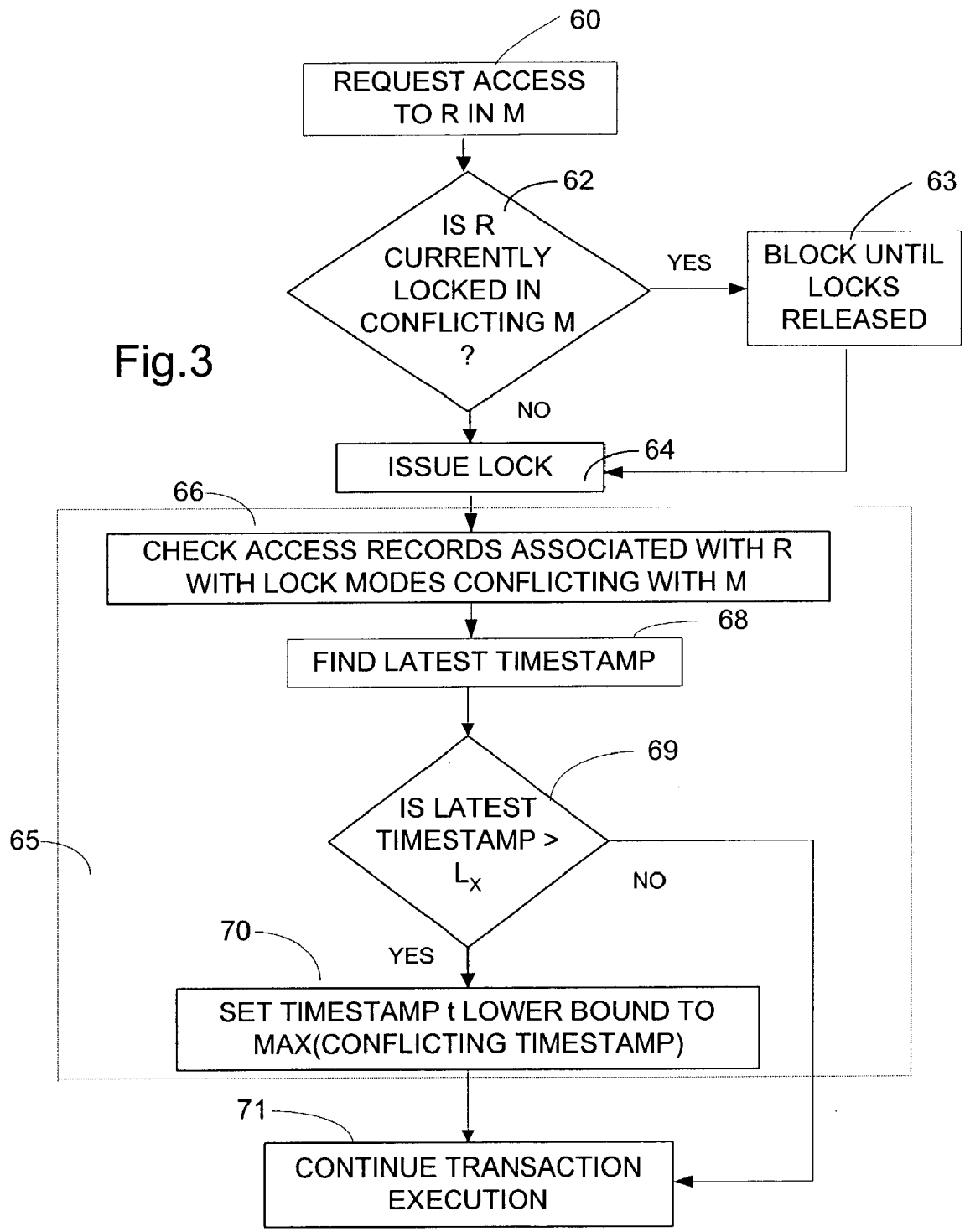
FIG. 3 is a flowchart illustrating identifying a lower bound for a timestamp.

The flow chart of FIG. 3 summarizes the steps taken by the timestamping lock manager to determine a lower bound for a timestamp. First, an active transaction TA requests 60 access to a resource R in lock mode M. The lock manager checks 62 whether resource R is currently locked in a mode that conflicts with lock mode M. If there is a conflict with a concurrent transaction, then the lock manager blocks 63 this request until all prior conflicting locks on resource R have been relinquished. Once there is no current conflicting lock on resource R, and the requested lock on resource R has been issued 64 to active transaction TA in mode M, the timestamping lock manager computes the lower bound. The subroutine 65 is used to compute the lower bound in the exemplary embodiment. The lower bound subroutine 65 first checks 66 the access records associated with resource R. These access records include <timestamp, Mi> pairs. The lock manager finds 68 the latest timestamp among the modes Mi that conflict with mode M for resource R, and compares 69 this latest timestamp to the current lower bound $L_x$ for the active transaction. If this latest timestamp is later than the current lower bound $L_x$, the lower bound $L_x$ is set 70 to this timestamp. This is the timestamping aspect of the timestamping lock manager. The lower bound subroutine 65 returns control to the active transaction TA allowing it to access the requested resource as it continues its execution 71.

Referring to FIG. 4, when an active transaction TA commits it is issued 74 a timestamp, updates access records, and releases 82 the locks that it holds on any resource. While transaction TA is committing, it goes to the lock manager and is issued 74 a timestamp. This timestamp has to be within the legal range of timestamps, and in particular has to be greater than the lower bound determined from examining access records. In the illustrated embodiment, subroutine 75 updates access records. For each lock that transaction TA will release, the subroutine examines 76 the access record for a locked resource R that has the same lock mode M as the mode in which it held its lock. If transaction TA has a timestamp that is later than the timestamp in the access record for R with mode M, then the timestamping lock manager replaces 78 this timestamp with the timestamp for transaction TA. TA's timestamp thus becomes the latest access to the resource R in lock mode M. In the exemplary embodiment, the updating subroutine 75 then determines 80 whether the resource R is the last resource that was locked by transaction X. If not, this updating process is repeated 81 for each remaining resource R that was locked by transaction X. Once the access records are updated for each locked resource R, the transaction releases 82 its locks and commits.

In summary, the timestamping lock manager keeps track of the timestamps of prior committed transactions that had conflicting accesses, and makes sure that when each active transaction commits, the timestamp assigned to it is later than all such prior timestamps. And then the lock manager updates this information to reflect the fact that transaction TA has now committed.

This method guarantees that timestamps for temporal data are ordered consistent with the serialization order. The method maintains for each transaction both upper and lower bounds for the timestamp that can be given to the transaction at commit. Should this range be empty, the transaction is aborted. For example, if a transaction reads data with a timestamp that is later than the transaction's upper bound, the transaction is aborted.

The disclosed method deals with transactions accessing ordinary data without timestamps. In addition, the method supports multi-granularity resources and hence avoids phantoms. In the exemplary embodiment, the lock manager already present in the database system 55 that correctly serializes transactions is enhanced so that it also provides a timestamp that agrees with the serialization order that it already provides.

Detailed Description of Timestamping Method

The disclosed method ensures that the transaction has a timestamp t that is later than the times of all earlier conflicting transactions. That is, a current transaction must be later in time than the transactions that have earlier accessed the resources in conflicting lock modes. Enforcing this guarantees that serialization and timestamp order agree. Thus, the latest timestamp of any earlier conflicting transaction becomes a lower bound for a transaction timestamp. Earlier times are not acceptable because then timestamp order would not be consistent with conflict order.

The disclosed method uses the timestamping lock manager TLM for timestamp selection. In the exemplary embodiment, the timestamping lock manager TLM assigns a timestamp to all transactions, whether or not they are accessing transaction time data. The timestamping lock manager TLM inspects lock conflicts to determine a lower bound $L_X$ for each transaction X. To accomplish this, a conventional lock manager is augmented with information about the timestamps for the preceding conflicting accesses. This augmented lock manager is the timestamping lock manager TLM. In the exemplary embodiment, an access timestamp table ATT contains the information (access records) about conflicting accesses. The access timestamp table ATT stores, in entry i, the largest timestamp of any earlier committed transaction accessing a resource R such that this resource hashes to i (i.e. h(R)=i) for each lock mode supported by the TLM.

The timestamping lock manager TLM also maintains the upper bound $U_X$ for transaction X. The upper bound being the maximum timestamp value that is consistent with the values $Cur_x$ returned by the CURRENT_TIME requests of transaction X. In this application a time function or CURRENT TIME function generally refers to any function that is based on the "time" given to the transaction, including but not limited to CURRENT TIME requests (i.e. current hour, current minute, etc.), CURRENT DATE requests, CURRENT TIMESTAMP requests.

In one embodiment, the present method does not maintain a lower bound for a transaction's timestamp. Rather, this embodiment of the present method assigns a transaction timestamp to the time indicated by the transaction's upper bound $U_X$, or the time value of $t_{cur}$ (the current time) when the transaction commits. The disclosed method checks to determine whether earlier conflicting accesses have times that are before the timestamp that will be assigned to a transaction. The present method checks for conflicts as a transaction accesses data. In the embodiment where the upper bound is chosen as the timestamp t, the method does not have to remember a lower bound $L_X$.

In addition to the normal functions of a classical lock manager, a timestamping lock manager TLM maintains an upper bound $U_X$ and a lower bound $L_X$ for the timestamps that will be assigned to transactions. The timestamping lock manager checks these bounds and aborts transactions in which it is not possible to assign a correct timestamp, i.e. when the timestamp range so determined is empty.

Figure 5:
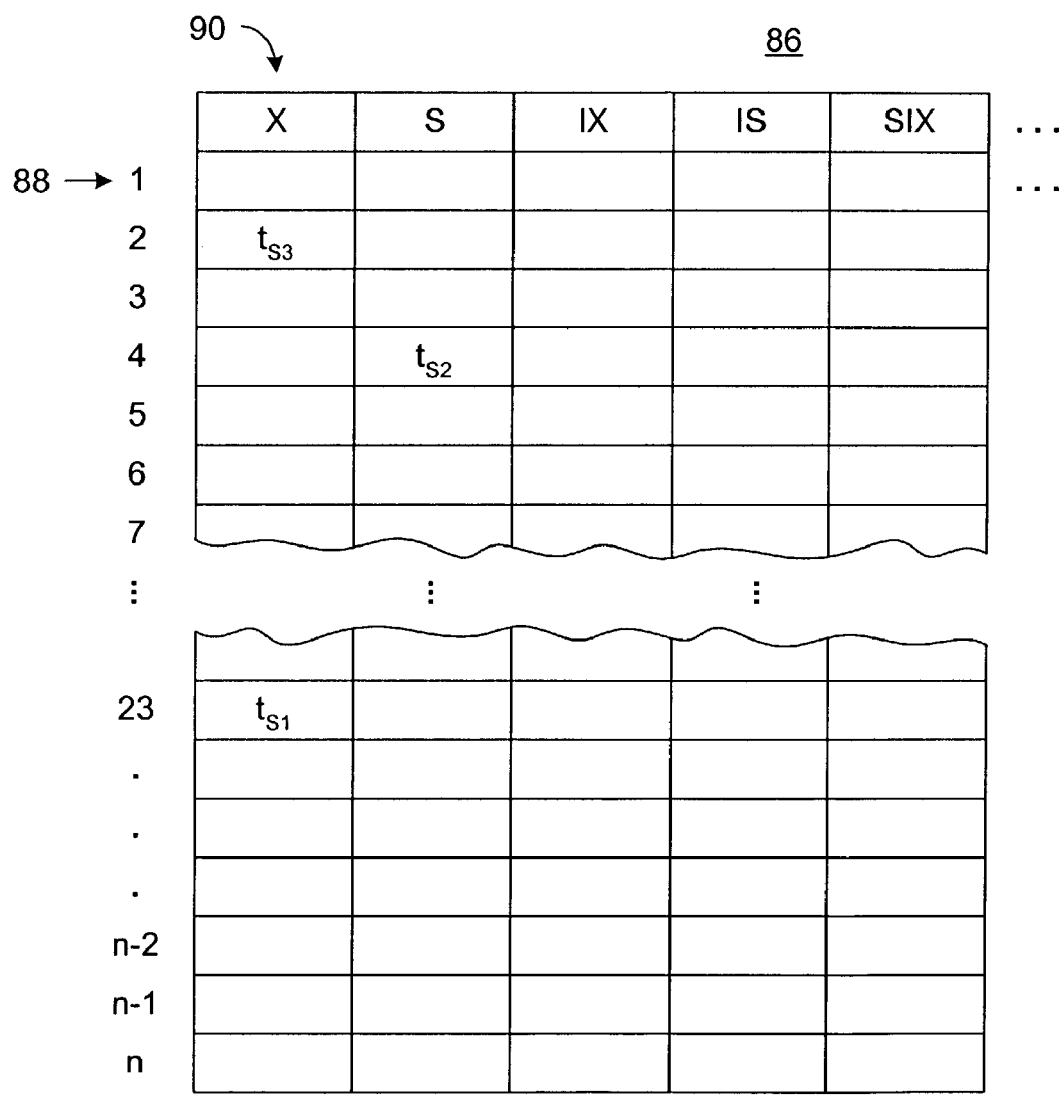
FIG. 5 is an illustration of a table that represents a collection of access records for transactions.

FIG. 5 illustrates an access timestamp table ATT 86. The access records 88 that contain lock mode and timestamp entries of resources R accessed by transactions are stored in an access timestamp table ATT 86. The access timestamp table is a conceptual representation of stored access records. An ATT entry or record 88 contains the timestamp of the last access in each different lock mode to any resource that gets assigned (via a hash function) to the entry. A resource that may correspond to an entry (access record) of the access timestamp table ATT may be a record, a range of records, a table, or a database page. More than one resource can map to a given record of the access timestamp table. Referring to FIG. 5, the access timestamp table ATT includes a column 90 for each lock mode recognized. The illustrated access timestamp table ATT corresponds to a lock manager that recognizes exclusive X locks, shared S locks, intention exclusive IX locks, intention shared IS locks, and shared with intention exclusive SIX locks. It should be readily apparent that the access timestamp table could record more or fewer types of lock modes. Thus an entry of the access timestamp table ATT contains a set of <m, $t_A$> pairs, where m is a lock mode and tA is the latest (largest) timestamp from any earlier committed transaction that accessed the resource in the hash set using lock mode m For example, referring to FIG. 5, $t_{s1}$ is the timestamp of the latest committed transaction that placed an exclusive lock on a resource that hashes to record Id 23 of the access timestamp table ATT. Each record 88 of the conceptual access timestamp table ATT corresponds to one or more lockable resources. In the exemplary embodiment, when a transaction X accesses a data item, not merely a record, but any resource in the multi-granularity resource hierarchy, the transaction X first acquires a lock in some lock mode that is relevant for the access. Referring to FIG. 3, the lock manager is used to check 62 whether the lock can be issued. Once the lock is issued 64, the lock manager employs the computing the lower bound subroutine 65 to compute the lower bound $L_X$. In the exemplary embodiment, the subroutine checks 66 the access timestamp table ATT for the timestamps of the past accesses to resources of that hash class. The subroutine determines whether a timestamp associated with the access timestamp table ATT entry for the requested resource that is paired with a lock mode that conflicts with the requested lock mode. If there is a conflict, the timestamp associated with the access timestamp table ATT provides a lower bound $L_X$ for the requesting transaction's timestamp. The maximum conflicting timestamp found in the access timestamp table is defined as follows:

Latest=max$\{t_A | <m,t_A>$ in ATT$[i]$, X accesses R, where $h(R)=i$, in mode $m_X$, and mode $m_X$ conflicts with mode $m$ $\}$ For example, if transaction $T_x$ reads data A, reads data B and writes data C, the method accesses the rows of access timestamp table ATT that correspond to data A, data B and data C. The method looks at the timestamps recorded for each lock mode that conflicts with the lock requested for data A in the row that corresponds to data A to find the maximum conflicting timestamp. This is repeated for data B and data C. The maximum conflicting timestamp from the access timestamp table ATT is set as the lower bound for transaction $T_x$. (i.e. if the conflicting timestamp found for data B is larger than the conflicting timestamps for data A and data C, the conflicting timestamp for data B is set as the lower bound $L_X$. All such access timestamp table ATT timestamps must be less than the transaction's upper bound $U_X$ or the transaction aborts.

The timestamping lock manager TLM can compute the lower bound $L_X$ incrementally when transaction X accesses and requests a lock for resource R, where $h(R)=i$, in mode mx, and mode $m_x$ conflicts with mode m for $<m,t_A>$ in ATT$[i]$. When the lock is granted, the timestamping lock manager TLM also computes 69,70 the lower bound $L_X$ as follows:

$L_X \leftarrow$ max$\{L_X,$ Latest$\}$.

The disclosed method maintains the access timestamp table ATT so that it continues to contain the latest timestamps of earlier committed transactions that accessed data using various lock modes. In the exemplary embodiment, the method uses two-phase locking to ensure transaction serializability and therefore a transaction cannot gain access to a resource until a prior conflicting transaction has released its locks when it commits. As a result, except for timeslice queries, the method only needs to post timestamps for committed transactions to the access timestamp table ATT, so that prior committed transactions will have earlier timestamps. Referring to FIG. 4, when a transaction commits, the locks held by the transaction are released 82 and the new lock and timestamp information is posted 78 to the access timestamp table ATT. For every resource locked by a committing transaction, for which the method has assigned a timestamp, the updating subroutine 75 posts the time for this transaction in the <mode m, timestamp $t_s$> for this resource's access timestamp table ATT entry if the timestamp is larger than the timestamp currently associated with the lock mode for this resource.

In the exemplary embodiment, redundant information or access records are removed from the access timestamp table ATT. In a transaction-time database, the each version of a record d contains the timestamp of the record's last writer as d.TT⁻. In one embodiment, the method avoids storing the record's timestamp <X,$t_A$> in the access timestamp table ATT and derives it instead from item d itself when item d is a transaction time item. The temporal item d is a precise identification of the resource, while the access timestamp table ATT entry may identify a class of resources that hash to the particular access timestamp table ATT entry. Using the timestamp in the record provides a more refined result than using the access record from the access timestamp table ATT entry. In this embodiment, the method avoids updating the access timestamp table ATT when dealing with X locks on temporal records. The method does check the timestamps in the records that are accessed instead of checking the access timestamp table ATT entries in this embodiment. In another embodiment, the method proceeds as if data item d did not have a timestamp d.TT⁻. This approach would mean that all data is treated the same, and the method need only check the access timestamp table ATT, not the data item itself.

It is the support for CURRENT_TIME requests that prevents using the time of commit as the timestamp for a transaction. In order to ensure consistency between the responses to CURRENT_TIME requests and transaction timestamps, a transaction may have to be assigned a timestamp that is earlier than its commit time. A CURRENT_TIME request will usually be for a time value with less precision than the full time precision maintained by the system. This is particularly clear when CURRENT_DATE is requested. The upper bound $U_X$ is derived from a CURRENT_TIME request is:

$U_X$=max$\{t|$CURRENT_TIME=prefix$(t)\}$

The upper bound $U_X$ for timestamps is determined by a CURRENT TIME request in a transaction. The flowchart of FIG. 6 illustrates how CURRENT TIME requests are processed in the exemplary embodiment. The method determines 92 whether current time has been requested earlier by this transaction. If CURRENT TIME was not requested earlier, the upper bound $U_X$ is initially set 94 to infinity. If CURRENT TIME was requested earlier by this transaction, the upper bound $U_x$ from the earlier request is initially used. In the exemplary embodiment, upper bound subroutine 96 is used to set the upper bound $U_x$. Whatever precision is requested, an upper and lower bound is provided. The result of a current-time request is the time on the system clock, truncated to the specified precision. Referring to FIG. 6, the upper end and lower timestamp bounds $U_X$, $L_X$ are set 98 based on the precision P and the maximum precision of time M in the exemplary embodiment. The lower bound $L_X$ for the transaction timestamp is the system clock time extended by '0' bits to the maximum time precision M, provided the lower bound provided by the system clock is greater than the previous lower bound for the transaction timestamp ($L_X$=max($L_X$,[P]($t_{cur}$)) where [P] ($t_{cur}$) yields the first P binary digits of $t_{cur}$). The upper bound $U_X$ is the time returned by the system clock extended by '1 ' bits to the maximum time precision, provided the upper bound provided by the system clock is less than the previous upper bound for the transaction timestamp. An approximation of a time calculation for the upper bound $U_X$ is given by the expression: $U_X$=min ($U_X$, [P]($t_{cur}$)concatenation with [M-P] ('1'B'S) where [P][$t_{cur}$] yields the first P binary digits of $t_{cur}$ and [M-P]('1'B' S) yields M-P binary '1'B digits. For example, if CURRENT DATE is requested the timestamp upper bound $U_X$ becomes the last time instant of the day (at maximum precision) for the day that is returned by the system clock. The interval start time $T_S$ for this time request is the first instant of the day returned by the system clock. When CURRENT TIME or CURRENT TIMESTAMP are requested at less than maximum precision, similar upper and lower interval limits are also set.

For example, the end time of a request for CURRENT HOUR made at 2:37 p.m. may be 2:59:59. p.m. The upper bound is not limiting when current time has not been requested by the transaction T.

When a transaction X accesses a resource R, it first acquires a lock in a mode appropriate for the access. In a conservative embodiment, for every transaction when the lock is issued, prior to returning control to the requesting transaction, the timestamping lock manager TLM computes the lower bound $L_X$ for transaction X. and checks whether the lower bound $L_X$ is less than the upper bound $U_X$. If this condition is not satisfied then the timestamping lock manager TLM aborts transaction X. In this conservative embodiment, for every transaction, at commit, the system uses timestamp $t_X$ to update each entry of the access timestamp table ATT for which transaction X had locked resources.

If each transaction always checks the times for conflicting earlier accesses in the access timestamp table ATT, and all transactions update the access timestamp table ATT when committing, the method can minimize the value for time assigned as a transaction's timestamp. Choosing the timestamp $t_X$ to be as early as possible maximizes the opportunity for other transactions to avoid the need to abort because of timestamp ordering violations. Essentially, this choice means that another transaction Y, reading or writing a resource locked by X, will be less likely to have an empty timestamp range. Thus, the method maximizes the chance that the timestamp assignment can be done correctly and minimize the probability of having to abort other transactions to maintain consistency between serialization order and timestamp order. Note, however, that any timestamp in the semi-open range $[L_X, U_X]$ will permit transaction X itself to successfully commit.

Reducing Overhead

Figure 2:
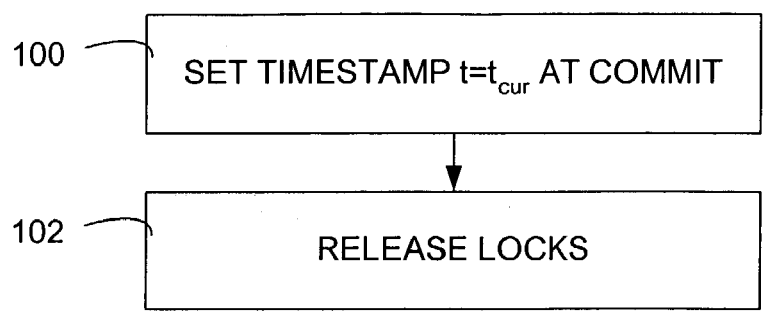
FIG. 2 is a flow chart illustrating timestamping of data in a database.

One classical prior art timestamping technique delays time stamp choice until commit. Referring to the schematic for this approach in FIG. 2, this technique simply sets 100 the timestamp equal to the time of commit ($t=t_{cur}$ at commit) and releases 102 the locks accessed by the transaction. In the exemplary embodiment, the disclosed method exploits using the classical timestamping technique, rather than accessing and updating the access timestamp table ATT when the timestamp choice can be deferred until transaction commit. One advantage is that deferring timestamp choice until commit is a very inexpensive technique, that requires no accessing of extra information while the transaction is accessing data, and no extra updating of auxiliary information used solely to correctly maintain timestamp order. This reduces overhead.

Unfortunately this classical technique cannot be used in its pure form because it cannot deal with CURRENT TIME requests. In this embodiment, the method deviates from the classical technique of timestamp choice at commit when CURRENT TIME is requested. By using a classical timestamping technique before a request for CURRENT TIME is made, the disclosed method reduces timestamping costs, to drive costs closer to a purely non-temporal approach, or closer to the classical commit time timestamping costs.

The extra timestamping lock manager TLM cost for dealing with CURRENT_TIME requests involves two aspects. First, the timestamping lock manager TLM needs to check, whenever a lock is granted to transaction X, that the lower bound $L_X$ is less than the upper bound $U_X$. Second the timestamping lock manager TLM needs to maintain the lower bound $L_X$ and the upper bound $U_X$ for each transaction X, whether or not X accesses transaction time data. The larger cost is in maintaining the access timestamp table ATT so that the timestamping lock manager TLM can compute the lower bound $L_X$ on every lock acquisition.

This embodiment relies on some assumptions to reduce overhead. If a slightly higher risk of aborting, caused when the method chooses the transaction timestamp to be later is acceptable, some large efficiencies become possible. Assumptions relied upon in this embodiment are as follows:

1) A transaction's timestamp is never later than the current time value when the transaction commits, i.e. the time at which the transaction finally releases its locks. This is the value for $t_{cur}$ when the transaction commits. $t_X = \min(t_{xcom}, U_X)$, where $t_{xcom}$ is the value of $t_{cur}$, the current time, when X commits.

2) A transaction's CURRENT TIME request never results in a transaction timestamp upper bound $U_X$ that is earlier than the minimum of the upper bound for prior CURRENT TIME requests and $t_{cur}$. As a result, if a CURRENT TIME request occurs after $t_{cur}$ is later than a transaction's upper bound $U_X$ its upper bound $U_X$ is unchanged ($U_X \leq t_{cur}$, $U_X$ is unchanged). If the CURRENT TIME request occurs when $t_{cur}$ is less than the upper bound $U_X$ the upper bound $U_X$ can be made earlier, but not earlier than the current time $t_{cur}$ ($t_{cur} < U_X$, $U_X$ can be made earlier, but not earlier than $t_{cur}$).

Together, these assumptions reduce the need both to check and to update the ATT.

Transaction X checks the access timestamp table ATT only to ensure that it is still possible to assign a timestamp $t_x$ that is less than the upper bound $U_X$ resulting from a CURRENT TIME request. This check can be bypassed when the current time $t_{cur}$ is less than the upper bound $U_X$. This is true because no earlier committed transaction can have a time later than $t_{cur}$ (by assumption 1), which requires that earlier committed transactions have earlier times since $t_{cur}$ was earlier when they committed. In addition, any transaction that commits later and conflicts with transaction X will have a timestamp later than commit time $t_{xcom}$. A non-checking transaction will have a later timestamp (by assumption 1), which requires that its timestamp be the current time $t_{cur}$ at the time that it commits. A checking transaction (with $U_X \leq t_{cur}$) will, because of its checking, be later than all prior conflicting transactions. Hence transaction X does not have to check that $U_X$ might be violated and X need to abort when $t_{cur} < U_X$.

If no active transaction is checking the access timestamp table ATT, then committing transactions do not have to update the access timestamp table ATT. All committed transactions (and hence all earlier conflicting transactions) have timestamps earlier than current time $t_{cur}$. Hence conflicts with these earlier transactions will not violate the required agreement between serialization order and timestamp order. Further, if the method starts maintaining the access timestamp table ATT when checking starts, all transactions that commit after checking starts will have timestamps later than the value of current time $t_{cur}$ at the time checking started. But these timestamps will be in the access timestamp table ATT, and the checking will discover the conflicts and order the timestamps correctly.

Two ways of exploiting these observations are described below. In one embodiment, checking and updating of the access timestamp table does not begin until an active transaction is requesting CURRENT TIME. In another embodiment, checking and updating of the access timestamp table ATT is delayed until after the actual current time $t_{cur}$ exceeds an upper bound defined by a CURRENT TIME request.

Checking and Updating Initiated by CURRENT TIME Request

In this strategy, a transaction starts checking the access timestamp table ATT when it makes a CURRENT TIME request, and the method does not maintain the access timestamp table ATT unless there is an active transaction that has made a CURRENT TIME request and hence is checking the access timestamp table ATT. This strategy is sufficient as it begins checking even before $U_X \leq t_{cur}$. Instead of checking the access timestamp table ATT for every transaction, the method starts checking a transaction when it makes a CURRENT TIME request. Thus, no "non-temporal" transactions need to check the access timestamp table ATT. When a transaction X makes a CURRENT TIME request, the value of the lower bound $L_X$ is set to $t_{cur}$ at this time.

Figure 3A:
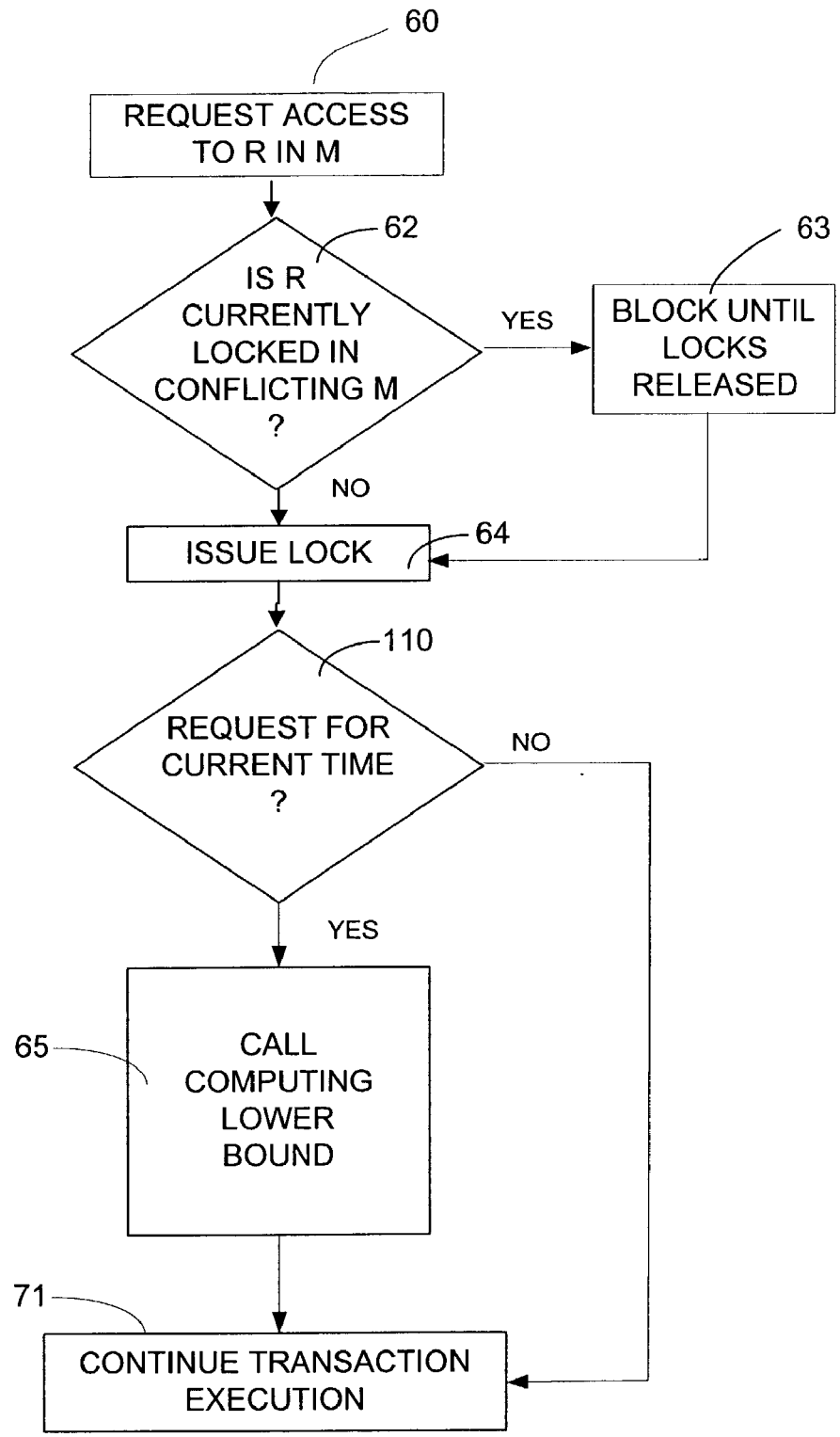
FIG. 3A is a flowchart illustrating identifying a lower bound for a timestamp in an alternate embodiment.

FIG. 3A is a flowchart that modifies the algorithm of FIG. 3 to delay computing the lower bound until an active transaction has made a CURRENT TIME REQUEST. The locking performed by the optimized algorithm of FIG. 3A (60, 62, 63, 64) is the same as the locking performed in FIG. 3. In this embodiment, the method determines 110 whether CURRENT TIME has been requested by an active transaction. If CURRENT TIME has been requested by an active transaction, the lower bound computing algorithm 65 is called to compute the lower bound $L_X$ for the timestamp. As in the unoptimized case, the timestamp lower bound $L_X$ is set to maximum timestamp of the conflicting resources. If CURRENT TIME has not been requested by an active transaction, the optimized method bypasses the computing lower bound subroutine 65 and continues transaction execution 71. The upper bound $U_X$ has been set by the upper bound subroutine 96 (FIG. 6) to the end time of the interval identified by the request for CURRENT TIME. The method then determines if the lower bound $L_X$ is less than the upper bound $U_X$. If the lower bound $L_X$ is greater than the upper bound $U_X$, the transaction is aborted. If the lower bound $L_X$ is less than the upper bound $U_X$, the transaction's timestamp can be set between the lower bound $L_X$ and the upper bound $U_X$. In one embodiment, the transaction's timestamp is set to the upper bound $U_X$ at transaction commit.

Waiting to check the access timestamp table ATT until a CURRENT TIME request occurs reduces the amount of access timestamp table ATT checking. Given assumptions 1 and 2 above, before a transaction first requests CURRENT TIME, the method does not have to check timestamps against access timestamp table ATT entries. Such checks are made to ensure that an upper bound $U_X$ that is determined by a CURRENT TIME request is not violated. However, before the first such CURRENT TIME request, there is no such upper bound. By assumption 1, which states that earlier committed transactions have earlier times, no earlier committed transaction can have a timestamp later than $t_{cur}$, and so cannot intrude on the method's assignment of a timestamp consistent with serialization order, which by assumption 2 will not be earlier than $t_{cur}$ (at commit time) for any transaction that does not request CURRENT TIME, nor earlier than $t_{cur}$ at the request for CURRENT TIME for those transactions that do make such requests. As a result, all earlier conflicting transactions (in fact, all earlier committing transactions) will have timestamps that are earlier than either time $t_{cur}$ that the method will use for the current committing transaction. Transactions that do not make CURRENT TIME requests do not incur access timestamp table ATT checking overhead since these transactions do not have upper bounds.

Figure 4A:
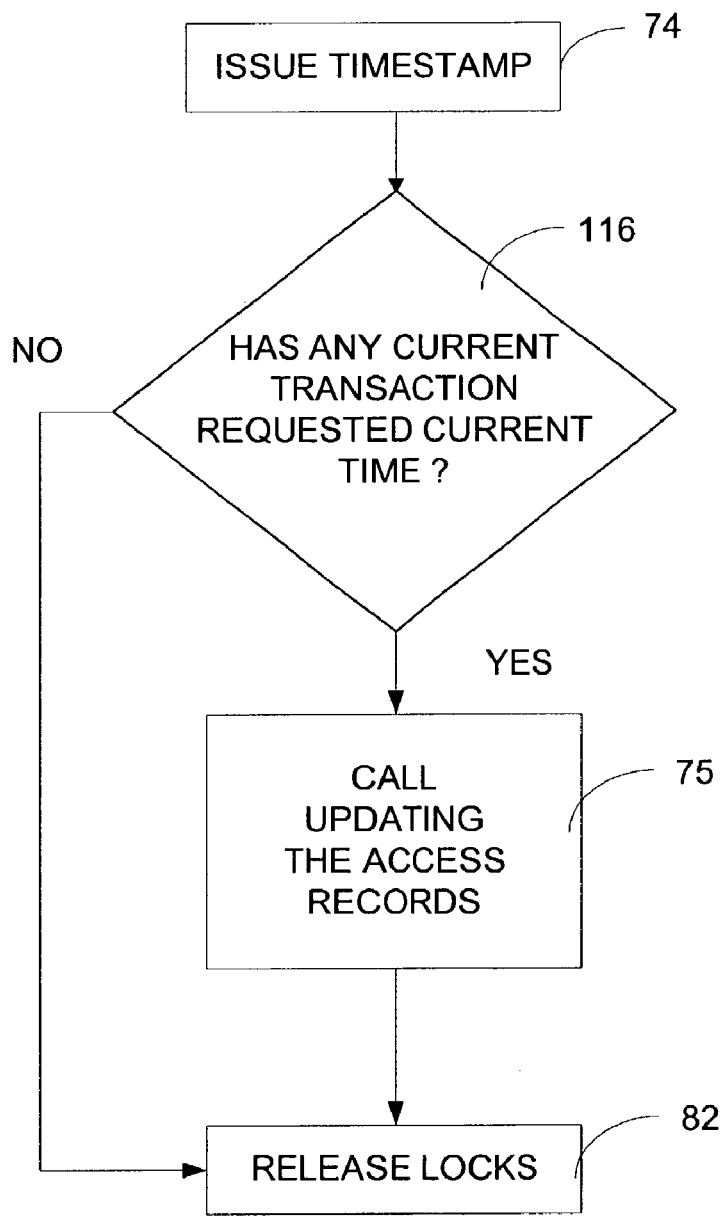
FIG. 4A is a flowchart illustrating updating access records in an alternate embodiment.

FIG. 4A is a flowchart that modifies the algorithm of FIG. 4 to delay updating of the access timestamp table until after a request for CURRENT TIME is made. The optimized algorithm of FIG. 4A determines 116 whether any current transaction has requested current time. If no active transaction has requested CURRENT TIME, then committing transactions do not have to update the access timestamp table ATT. As such, the optimized algorithm of FIG. 4A bypasses the updating access records subroutine 75 and simply issues the transaction's timestamp and releases locks held by the transaction at commit. If upper bound $U_X$ has not been reached. No subsequent committing transaction's timestamp can be impacted by transactions that commit during this period, since no such subsequent transaction can have a timestamp earlier than the current value of $t_{cur}$ when CURRENT TIME is requested. Aside from checking that this is the case, no extra overhead is required by the disclosed timestamping solution when ordinary database activity is all that is going on.

Figure 4B:
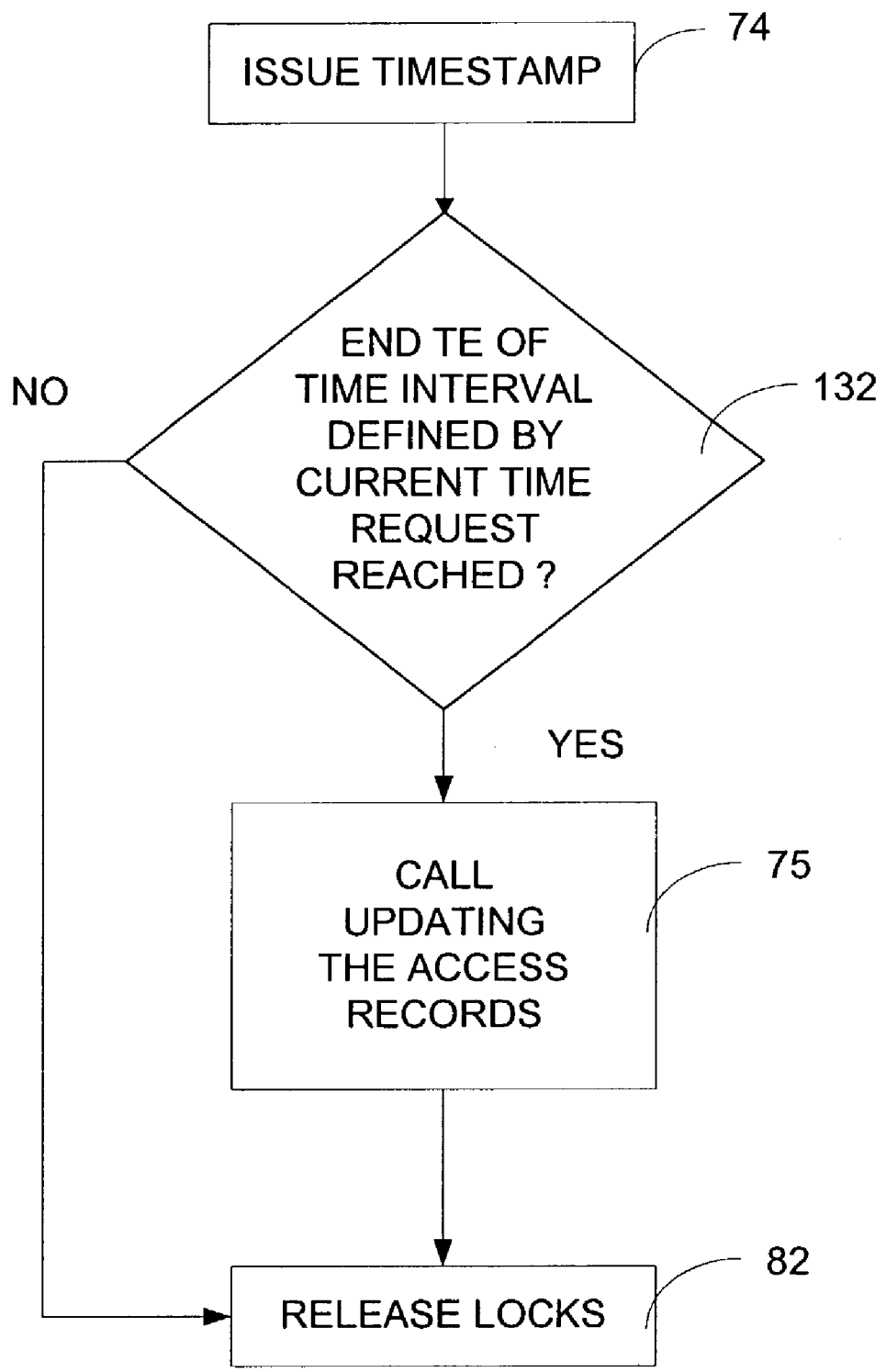
FIG. 4B is a flowchart illustrating updating access records in an alternate embodiment.
Figure 4C:
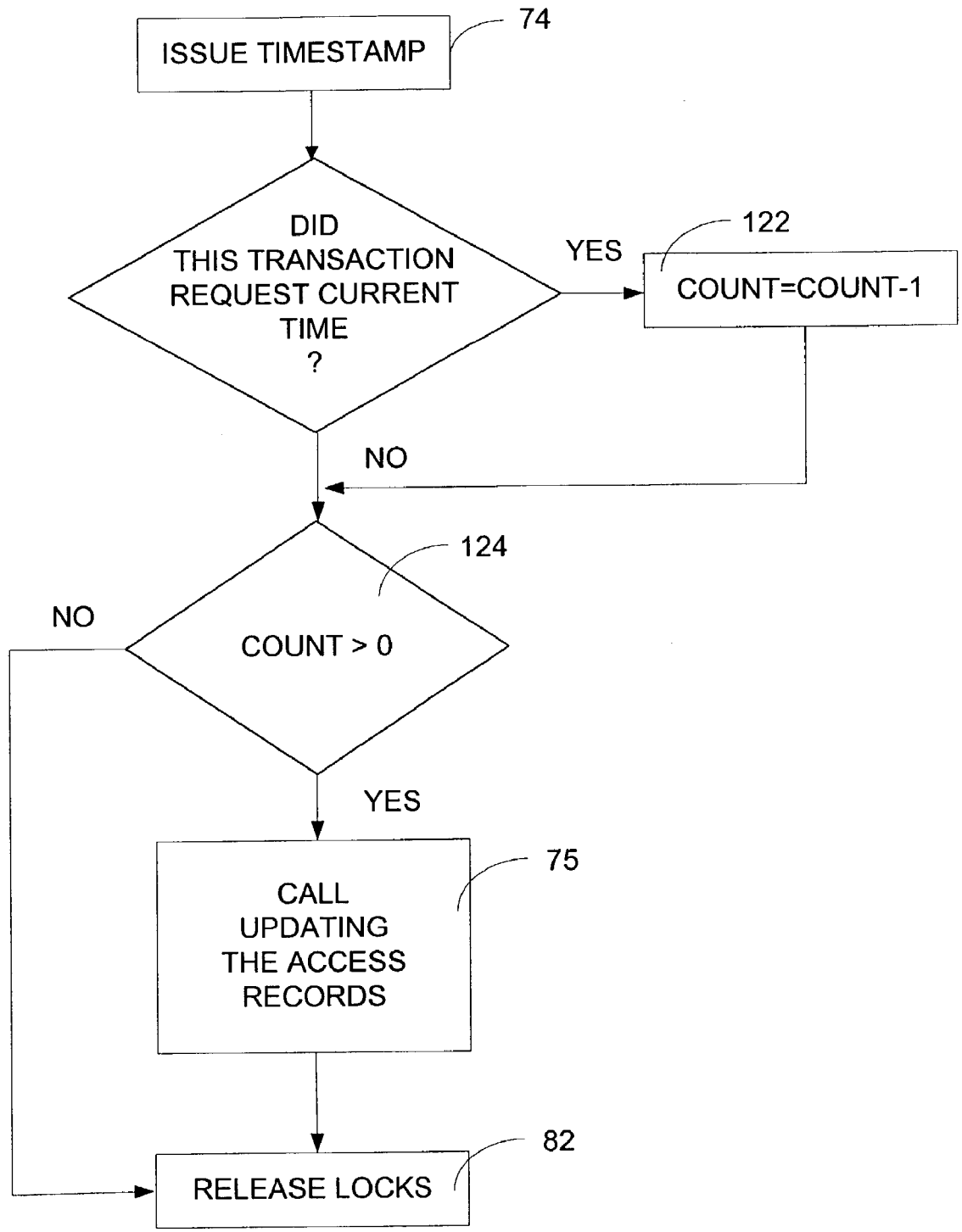
FIG. 4C is a flowchart illustrating updating access records in an alternate embodiment.
Figure 6A:
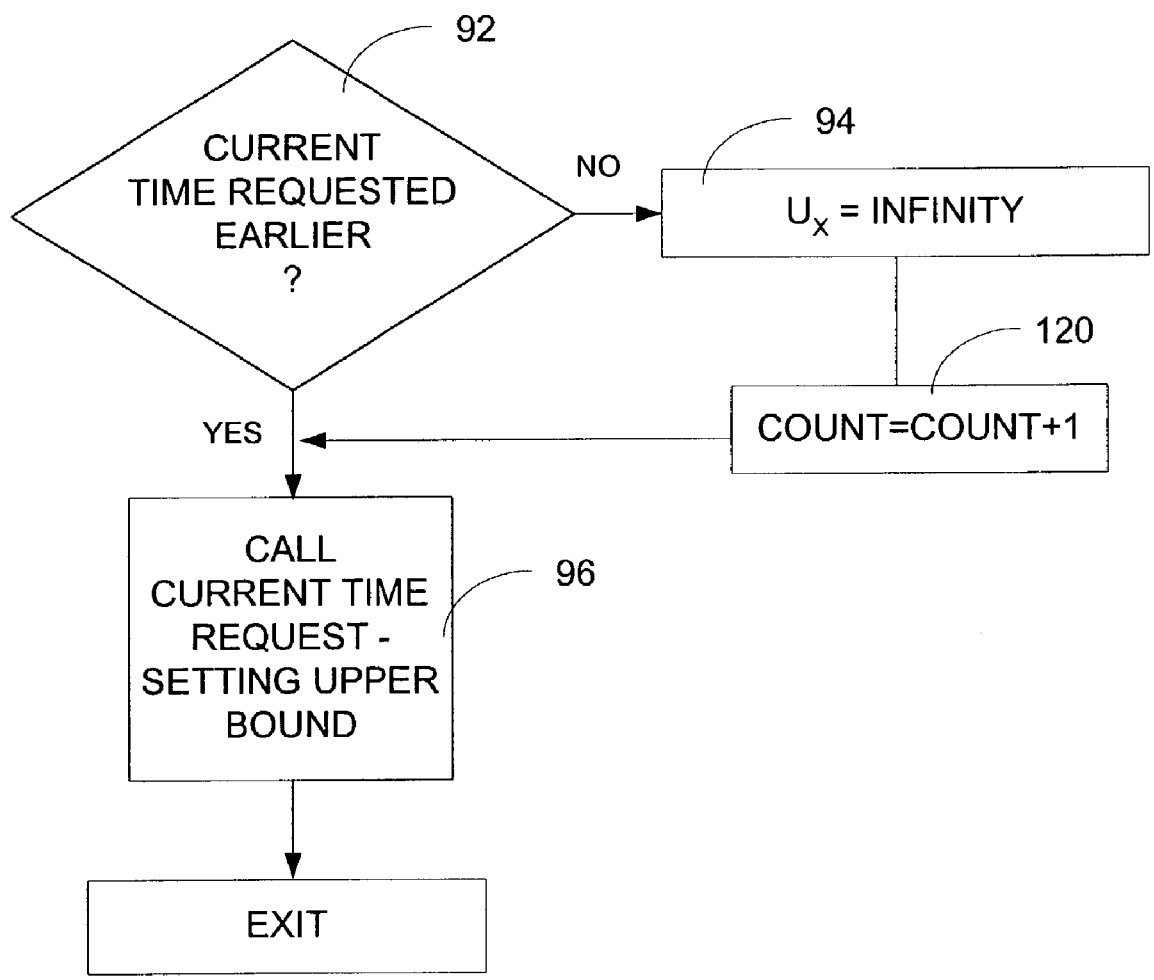
FIG. 6A is a flowchart illustrating processing of CURRENT TIME requests in an alternate embodiment.

Referring to FIGS. 6A and 4C, in one embodiment the method determines whether an active transaction has made a request for CURRENT TIME with a "checking transactions" counter. FIG. 6A is a modified version of the CURRENT TIME processing algorithm of FIG. 6 that adds one to the checking transaction counter when CURRENT TIME is requested. FIG. 4C is a modified version of the optimized algorithm of FIG. 4A that subtracts one from the checking transactions counter when a transaction commits. Referring to FIG. 6A, CURRENT TIME requesting transaction adds 210 one to the "checking transactions" counter Referring to FIG. 4C, when this transaction commits or aborts, the transaction subtracts 122 one from the "checking transactions" counter. Any committing transaction checks 124 the counter, and posts its lock and timestamp information to the access timestamp table ATT by calling the updating the access records subroutine 75 when the counter is greater than zero. In the embodiment illustrated by FIG. 4C, checking transaction subtracts from the counter during its commit prior to checking the counter. Thus, if the transaction is the only transaction requesting CURRENT TIME, the transaction need not update the ATT. Once no active transactions are requesting CURRENT TIME, the present method stops updating the access timestamp table.

Checking and Updating Initiated When $t_{cur}$ Exceeds CURRENT TIME Upper Bound $U_X$ In one embodiment, the method does not check or update the access timestamp table ATT, until the current actual time $t_{cur}$ is greater than the CURRENT TIME request upper bound $U_X$ for some transaction X. This is less frequent checking than checking as soon as a request for CURRENT TIME has been made because there can be a CURRENT TIME requesting transaction X active, which would trigger checking, but it might have an upper bound $U_X$ greater than $t_{cur}$. However, no transaction can have an upper bound without having made a CURRENT TIME request.

In this embodiment, the method only maintains an upper bound $U_X$ for active transaction X and assigns to transaction X a timestamp $t_x = \min(U_X, t_{cur})$.

Figure 3B:
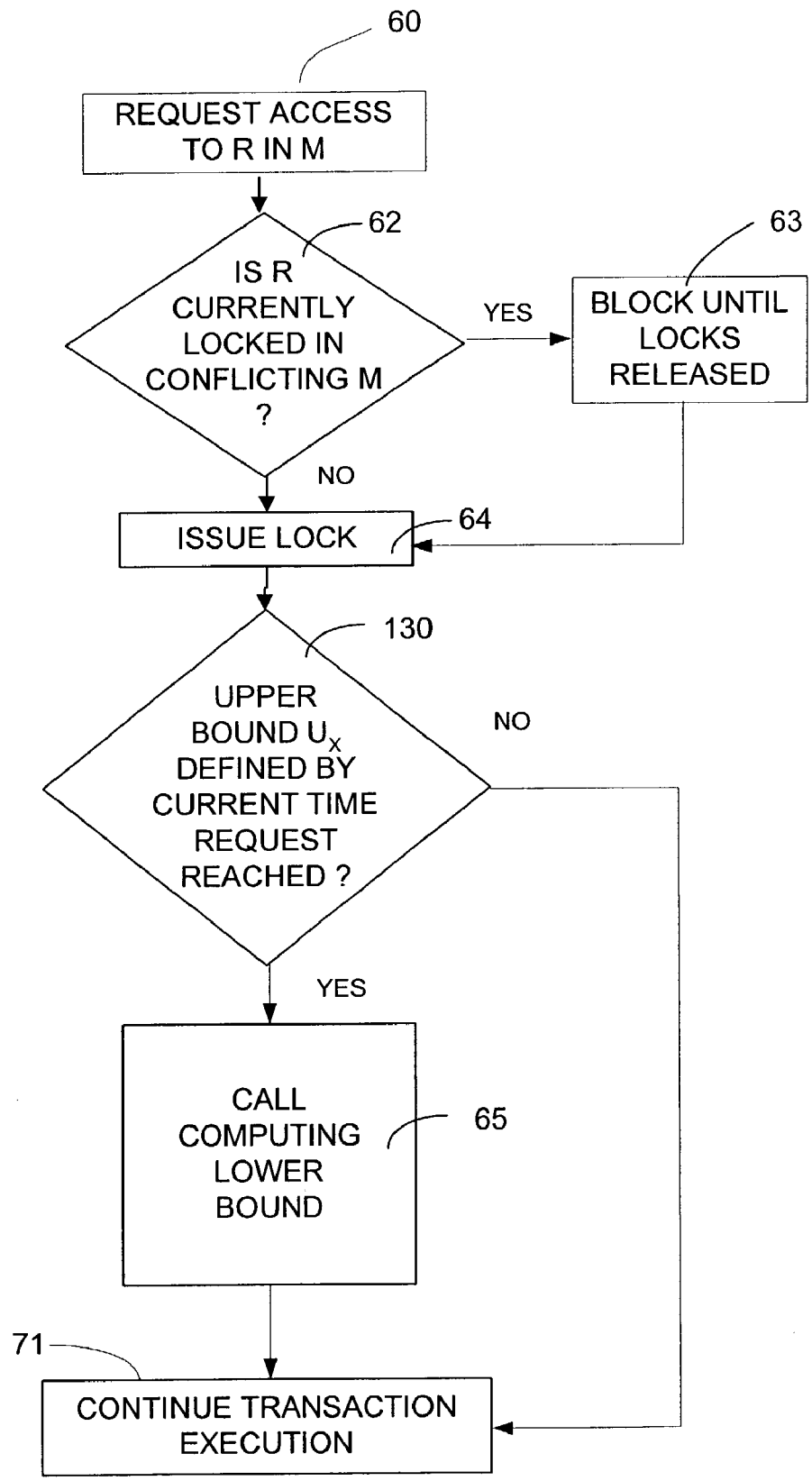
FIG. 3B is a flowchart illustrating identifying a lower bound for a timestamp in an alternate embodiment.

FIG. 3B is a flowchart that modifies the algorithm of FIG. 3 to delay computing the lower bound until an upper bound $U_X$ resulting from a CURRENT TIME request has passed. In this embodiment, the method determines 130 whether the upper bound $U_X$ defined by a request for CURRENT TIME by an active transaction has been reached (i.e. the actual time $t_{cur}$ is greater than or equal to upper bound $U_X$). If so, the lower bound computing algorithm 65 is called to compute the lower bound $L_X$ for the timestamp. If $U_X$ has not been reached, the optimized method bypasses the computing lower bound subroutine 65 and continues transaction execution 71. The upper bound $U_X$ is set by the upper bound subroutine 96 (FIG. 6) to the end time of the interval identified by the request for CURRENT TIME. The method then determines if the lower bound $L_x$ is less than the upper bound. If the lower bound $L_x$ is greater than the upper bound $U_X$, the transaction is aborted. If the lower bound $L_x$ is less than the upper bound $U_X$, the transaction's timestamp is set between the lower bound $L_x$ and the upper bound $U_X$.

Waiting to check the access timestamp table ATT until the current value of time $t_{cur}$ exceeds the upper bound defined by a CURRENT TIME request further reduces the amount of access timestamp table ATT checking. A CURRENT TIME request imposes an upper bound $U_X$ on the range of acceptable times for the transaction. The method does not have to check times in the access timestamp table ATT during locking until this upper bound $U_X$ is reached. Instead the method compares $t_{cur}$ with the transaction's upper bound $U_X$, if the transaction has one, and bypasses access timestamp table ATT checks if $t_{cur}$ is less than the transaction's upper bound $U_X$.

FIG. 4B is a flowchart that modifies the algorithm of FIG. 4 to delay updating of the access timestamp table ATT until $t_{cur}$ is greater than a transaction's upper bound $U_X$. The optimized algorithm of FIG. 4B determines 132 whether $U_X$ defined by requests for CURRENT TIME by an active transaction has been reached. The method does not have to update the access timestamp table ATT so long as no transaction's upper bound is less than $t_{cur}$. As such, the optimized algorithm of FIG. 4B bypasses the updating access records subroutine 75 and simply issues the transaction's timestamp and releases locks held by the transaction at commit. That is, the access timestamp table ATT does not have to be updated, so long as there is no transaction that needs to check the timestamps in the access timestamp table ATT. In this embodiment, the update of the access timestamp table ATT is started when the first transaction is encountered that needs to check the ATT because its upper bound $U_X$ is earlier than $t_{cur}$. All earlier transactions will have timestamps less than the upper bound $U_X$ of such a new checking transaction, and so cannot prevent this newly checking transaction from successfully committing due to a timestamp order violation.

Figure 4D:
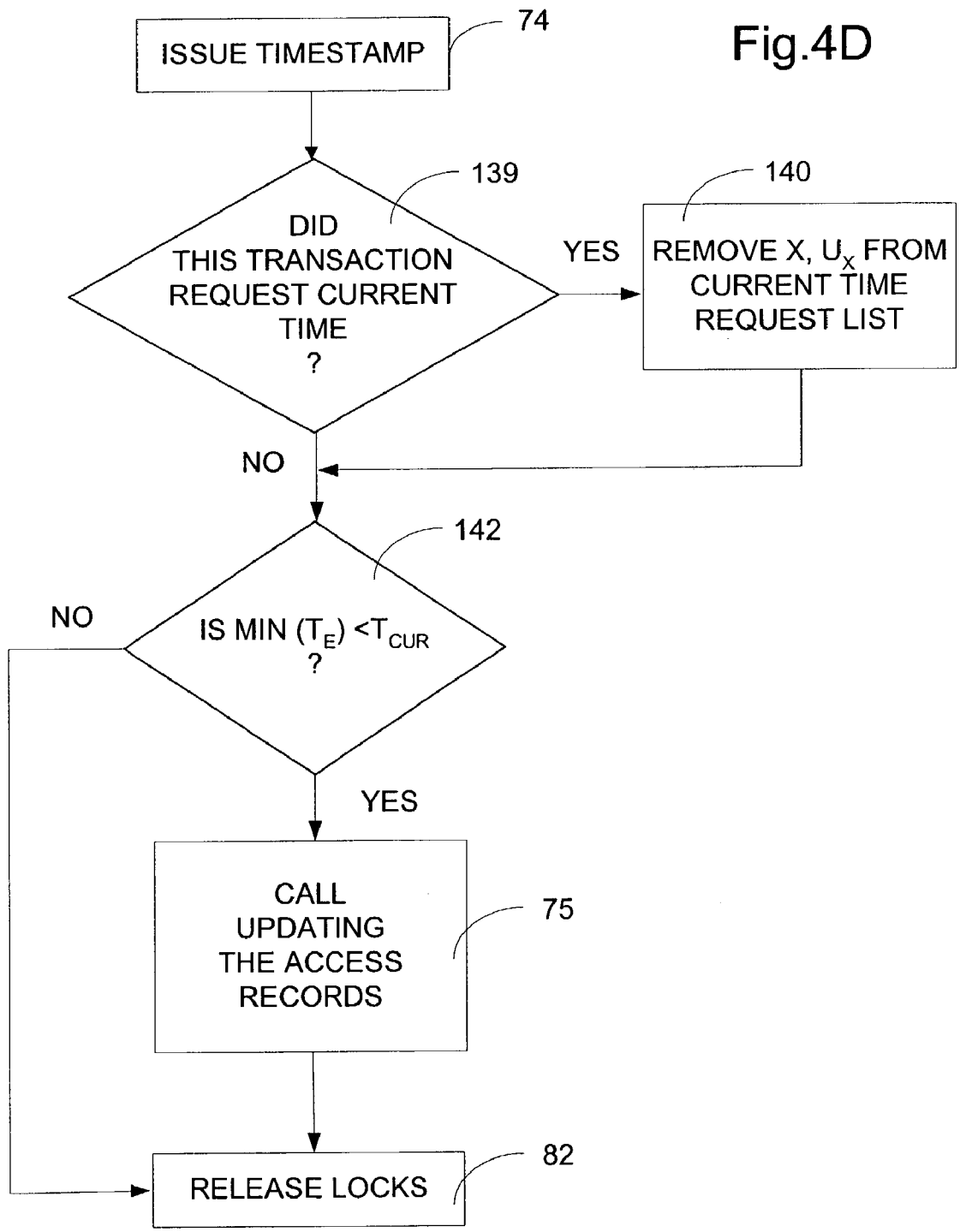
FIG. 4D is a flowchart illustrating updating access records in an alternate embodiment.
Figure 6B:
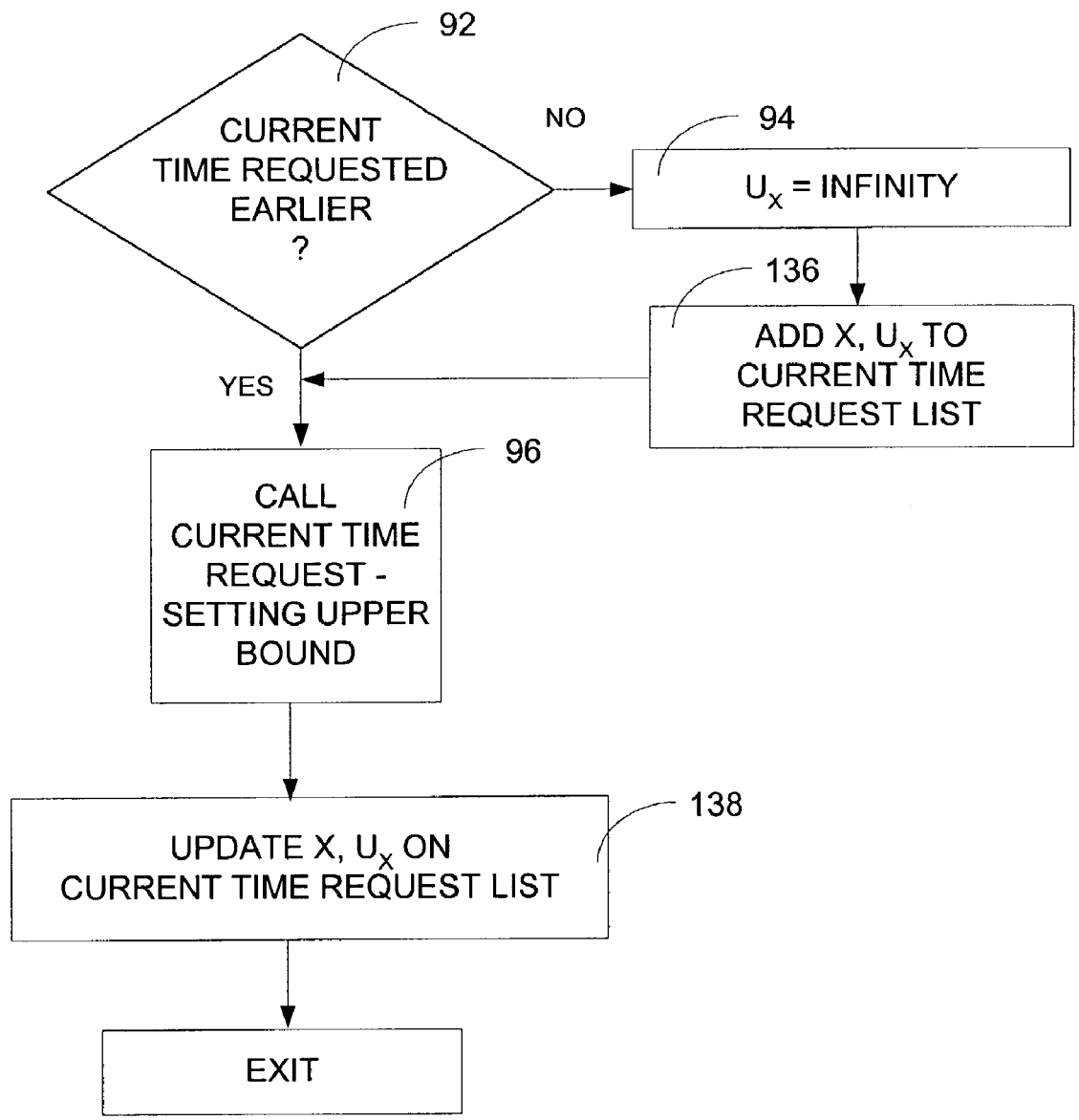
FIG. 6B is a flowchart illustrating processing of CURRENT TIME requests in an alternate embodiment.

Updating the access timestamp table ATT can be delayed until at least one transaction's upper bound $U_X$ is reached. However, because such a transaction is not requesting a lock on a resource via the TLM when this occurs, the TLM cannot, wait until it responds to a request from this transaction trigger the updating of the access timestamp table ATT. So the TLM now needs to initiate checking the access timestamp table ATT by noting that this transaction is a checking transaction during requests from other transactions. Referring to FIGS. 4D and 6B, in one embodiment the method maintains an ordered list for the transactions based on the transaction's upper bound $U_X$. FIG. 6B is a modified version of the CURRENT TIME processing algorithm of FIG. 6 that adds a transaction X and its upper bound $U_X$ to the ordered CURRENT TIME request list when CURRENT TIME is requested. FIG. 4D is a modified version of the optimized algorithm of FIG. 4B that removes the transaction and its upper bound $U_x$ from the ordered CURRENT TIME request list when transaction X commits. Referring to FIG. 6B, the method adds 136 a transaction's upper bound $U_X$ to the list as soon as it has an upper bound, i.e. when the transaction makes a CURRENT TIME request. The end time defined by the CURRENT TIME request is determined by calling the current time request—setting upper bound subroutine 96. The list is updated 138 with the upper bound $U_X$ calculated by the subroutine. Referring to FIG. 4D, the method determines 13a whether the committing transaction requested CURRENT TIME. If the committing transaction requested CURRENT TIME, the method removes 140 the committing transaction from the list when the transaction commits. Note that there can be an upper bound list of transactions that have made CURRENT TIME requests without having to post commit times to resources in the access ATT. The method determines 142 whether the upper bound $U_X$ is less than the actual current time $t_{cur}$. In this embodiment, the method calls the begin updating to access records subroutine 75 to begin updating the access timestamp table ATT once the earliest upper bound $U_X$ in the list is less than the current time $t_{cur}$.

Most transactions will commit with timestamps assigned as $t_{cur}$ and so updating the access timestamp table ATT will be done when the earliest upper bound $U_X$ in the list is earlier than $t_{cur}$. However, some transactions will commit with timestamps that are earlier than $t_{cur}$ because they have earlier upper bounds $U_X$. The transaction with the earliest upper bound $U_X$ does not need to update the access timestamp table ATT with its commit time. No subsequent other transaction can commit with an earlier time. As a result, a checking transaction may not need to update the access timestamp table ATT, even when the checking transaction is not the last such active checking transaction.

Lower Bounds

In the previously described embodiment, the timestamp assigned by the method was either the upper bound $U_X$ for a transaction or $t_{cur}$ at the time of commit, whichever is earlier. This assignment reduces the checking required by the system. Assigning timestamps in this manner, however, can increase the number of aborts that are required in order to maintain timestamps consistent with serialization order. This could be a problem if database systems reply to CURRENT TIME requests with a time having too great a precision. When assigning timestamps equal to an upper bound or the time $t_{cur}$ at commit results in a significant number of aborts, the exemplary method is modified to deal with the increased aborts.

More transactions may be aborted when using the disclosed optimizations than would be aborted if more extensive checking was done, although the number of such aborted transactions is expected to be small. For example, a transaction $T_1$ may start executing at 1 PM, and ask for CURRENT DATE at 11 PM. Using the disclosed method transaction $T_1$ will have a timestamp that is later than 11 PM. Another timestamping method, which keeps track of exactly what resources are accessed, might have been able to give transaction $T_1$ a timestamp as earlier as 1 PM. While transaction $T_1$ may be able to commit appropriately, another transaction $T_2$, which reads data written by $T_1$, may have had an upper bound $U_X$ of say 2 PM. Transaction $T_2$ would have successfully committed had transaction $T_1$ gotten the earlier timestamp (1 PM). But with a timestamp after 11 PM for transaction $T_1$, transaction $T_2$ must be aborted.

While the disclosed method may increase the number of aborted transaction, the number of such cases is likely to be small. The following are reasons why the number of cases such cases should be small.

1. In most databases, the number of distinct resources is high, so the likelihood that a subsequent transaction encounters the effects of a long running transaction as in our example above is small.

2. The example above accentuates the problem. Most requests for CURRENT TIME will result in much smaller intervals between the earliest possible correct timestamp assignment and the disclosed technique of assigning the latest possible timestamp. The flexibility of other more rigorous approaches to keeping track of bounds for transaction timestamps will be less than suggested by the example.

In one embodiment, the disclosed method reduces the number of such aborts while providing much of the optimization gain of reduced access timestamp table ATT checking and updating. In this embodiment, the method may track timestamp lower bounds for the resources when the number of aborts is too high.

By tracking timestamp lower bounds, earlier timestamps can be assigned. The earlier the timestamps can be for committing transactions, the fewer the number of transactions that will need to be aborted to preserve the consistency between timestamp and serialization orders. If the method determines too many aborts are occurring, the method begins updating and checking the access timestamp table ATT. In one embodiment, to accomplish reduce aborts, the method begins to maintain a lower bound $L_X$ for transaction timestamps in addition to an upper bound $U_X$. To realize a reduction in aborts, the method then chooses a transaction's timestamp that is at the lower bound $L_X$ of its timestamp range. Because no transaction that committed earlier than the time at which the method begins checking can have a timestamp later than $t_{cur}$ at the time the method begins checking, the method can begin checking at any time, and use this $t_{cur}$ as the initial lower bound $L_X$ for currently active transactions In this embodiment, one objective is to reduce aborts. At the moment the method begins checking and updating the access timestamp table ATT, the method also begins maintaining a lower bound $L_X$ for transaction timestamps. The initial lower bound $L_X$ for any transaction is either its start time or $t_{cur}$ as of the time the method begins begin checking, whichever is later. The method increases the lower bound as data is accessed that has an access timestamp table ATT entry with a conflicting mode whose timestamp is higher, making this higher access timestamp table ATT timestamp the new lower bound $L_X$.

In one embodiment, the method then provides a lower bound $L_X$ while the method exploits the disclosed optimizations. To do this, the method begins access timestamp table ATT checking for a transaction when either it requests CURRENT TIME, or when its upper bound $U_X$ determined by a CURRENT TIME request is passed (i.e. $t_{cur}$ exceeds this upper bound $U_X$). As disclosed above, the method begins updating the access timestamp table ATT whenever there is an active checking transaction. This is the same as the optimized checking described earlier. However, in this embodiment the method maintains a lower bound $L_X$ as well as an upper bound $U_X$ for transaction timestamps once there is a transaction checking the ATT. In this embodiment, the method chooses the timestamp to be at the lower bound $L_X$ of this range.

If too many aborts are still encountered the method may always check and update the access timestamp table ATT. In this embodiment, the method begins checking and updating the access timestamp table ATT at any convenient time. The method can freely select the transactions for which a lower bound $L_X$ is maintained.

Timeslice Queries

Data is timestamped with the transaction time to support transaction-time database functionality. One significant reason why data is timestamped with the transaction time is to support timeslice queries. A timeslice query is a query that requests the state of part of the database as of some particular time, referred to as the query's read time RT. For example, using snapshot isolation for a transaction, the transaction will query the database with a read time RT as of the start time of the transaction. More generally, with a transaction-time database, a transaction can query the database as of any read time RT in the past. The expectation is that the result will be a transaction consistent view of the database. For transaction-time databases, this view will consist of data timestamped with the largest timestamp less than or equal to its read time RT.

Thus, to correctly support timeslice queries, the method ensures timeslice queries read data appropriate to their read time. It is also necessary to schedule transactions executing timeslice queries correctly in the transaction serialization order. These requirements are no different than the requirements normally placed on transactions. What makes this different is that, timeslice queries are executed, which may be only part of a larger transaction, without locking the data that is read by the timeslice query in the exemplary embodiment. However, as is the case with ordinary "locking" transactions, the method both checks timestamps in the access timestamp table ATT, and updates timestamp information in the access timestamp table ATT because of timeslice queries, as done by ordinary locking transactions.

Some timeslice queries are "safe" without locking. For example, in the following two frequent cases, non-locking timeslice queries are easy to realize, and have no impact on the timestamping of remaining transactions.

1. The timeslice query read time RT is earlier than the earliest upper bound $U_X$ for any uncommitted transaction and, also earlier than the current value of $t_{cur}$. Such a timeslice query cannot be impacted by ongoing update activity, as no existing or future transaction can provide data with a timestamp that is early enough to be seen by the query. In addition, the query has no impact on the timestamps of other transactions, since all these transactions are already later than the timeslice read time RT.

2. The version of the data requested by the timeslice query is no longer the current committed version, i.e. all requested data has been updated since the read time RT of the timeslice query. As a result, the timeslice query never sees current data, and hence no updating transaction can be impacted by the timeslice query, and the timeslice query cannot be impacted by any updating transaction.

In cases where there is no transaction requesting CURRENT TIME (hence giving the requesting transaction an upper bound $U_X$ after which it cannot commit), then the earliest time at which an uncommitted transaction can commit becomes the current value of $t_{cur}$. Since the read time RT of a timeslice query is always "in the past", the read time RT will always be less than $t_{cur}$. In this case, a timeslice query cannot impact updating transactions, and updating transactions cannot impact the timeslice query. This is a reason that snapshot queries in some commercial databases can execute without locking, and without taking any additional measures to ensure timestamp consistency. In the exemplary embodiment, snapshot isolation enables snapshot reads without locking, so that the readers are not blocked by updaters, nor are updaters blocked by snapshot readers.

There is a potential difficulty when transactions are permitted to request CURRENT TIME and force their transaction timestamp to be earlier than an upper bound $U_X$ imposed by a CURRENT TIME request. This difficulty results in potentially "unsafe" timeslice queries.

One potentially "unsafe" timeslice query arises when there is a transaction $T_1$ that has an upper bound $U_X$ before which it must commit that is earlier than a timeslice query's read time RT in transaction $T_2$. In that case, should $T_1$ commit, and should $T_2$'s timeslice query read the data updated by $T_1$, then the timeslice query would be required to have read the version of the data resulting from the updates of $T_1$. That does not pose a problem when $T_1$ commits before $T_2$ reads the updated data. But if $T_2$ reads this data while $T_1$ is uncommitted, a problem arises. The exemplary method deals with two scenarios. The first scenarios is when transaction $T_2$, the timestamp reader, reads the data before updating transaction $T_1$ comes upon the data for update. The second scenario is when updating transaction $T_1$ has already updated the data that is being read by the timeslice query of $T_2$.

Timestamp Reader First

When transaction $T_2$, the timestamp reader, reads the data before updating transaction $T_1$ comes upon the data for update the method can make transaction $T_1$ aware of the read done by transaction $T_2$. This can be done in the same way that $T_1$ becomes aware of any other read by ordinary transactions that have committed already. That is, transaction $T_2$ updates the access timestamp table ATT based on its read time RT, at the time transaction $T_2$ does the read. Transaction $T_2$ does this by updating the appropriate access timestamp table ATT lock mode column with its read time RT. The appropriate column of the access timestamp table is the column that would have been used had the transaction been an ordinary transaction that had read the data and committed. In the exemplary embodiment, this lock mode is S or "shared". But the timeslice reader does not wait for commit to update the access timestamp table ATT with its read time RT because this embodiment of the method assumes that the timeslice query does no locking. As a result, there is no way to protect the data from conflicting operations until transaction $T_2$ commits. Transaction $T_1$, which will be a "checking" transaction, looks at its data's entry in the access timestamp table ATT, sees that the data has a timestamp in the column for a conflicting operation (the share mode column) that is later than $T_1$'s upper bound, and hence transaction $T_1$ is forced to abort.

To deal with this case, the disclosed method needs transaction $T_2$, the timeslice reader, to assign resource identifiers to the data that it reads that are the same resource identifiers used for locking data. In this manner, the disclosed method can then update the access timestamp table ATT exactly as required. Hence, timeslice queries update the access timestamp table ATT as if they were ordinary readers, but they do it when they read, rather than when they commit. And, the timeslice queries are neither blocked, nor do they block, other transactions, though they may cause other transactions to abort.

Updater First

The second scenario occurs when updating transaction $T_1$ has already updated the data that is being read by the timeslice query of $T_2$. One way to deal with this case is to have transaction $T_2$ check the locks on the data being read by its timeslice query prior to doing the read, as if transaction $T_2$ were required to lock the data. But transaction $T_2$ will not leave locks on the data. Rather, transaction $T_2$ only updates the access timestamp table ATT. Transaction $T_2$ checks for locks that would conflict with its read were it a normal reader. If transaction $T_2$ finds such a lock, and the holder of the lock, e.g. $T_1$, has an upper bound $U_X$ that is earlier than transaction $T_2$'s read time RT, the method then forces the abort of transaction $T_1$. As in the "timeslice reader first" case, the method updates the access timestamp table ATT to inform future updaters of the time of the read.

In this embodiment, transaction $T_2$, the non-locking timeslice reader, checks for locks as if it were a normal reader. If transaction $T_2$ finds an active update transaction that has an upper bound earlier than its read time RT, then if the method is to avoid blocking the timeslice query, the method must either abort the timeslice query itself, or abort the updating transaction. In the exemplary embodiment, aborting the conflicting updating transaction allows the timeslice queries to run safely without blocking, locking, or aborting.

In one embodiment, the performance impact on timeslice queries can be minimized by having them check "large grained" resources when checking locks and set access timestamp table ATT entries for the large grained resources. There is a trade-off between the overhead of checking locks and updating the access timestamp table ATT, and the number of update transactions that might be impacted. If the timeslice "granule" or resource is a relational table, then any updater transaction $T_u$ holding an "intention exclusive" (IX) lock on the table and that has an upper bound on its commit time that is earlier than the timeslice query's read time RT must be aborted. This conflict is manifested by the fact that the IX lock mode of $T_u$ conflicts with the S "lock mode" of the timeslice query. This is one way of dealing with the interaction of timeslice queries with updating transactions.

Figure 3C:
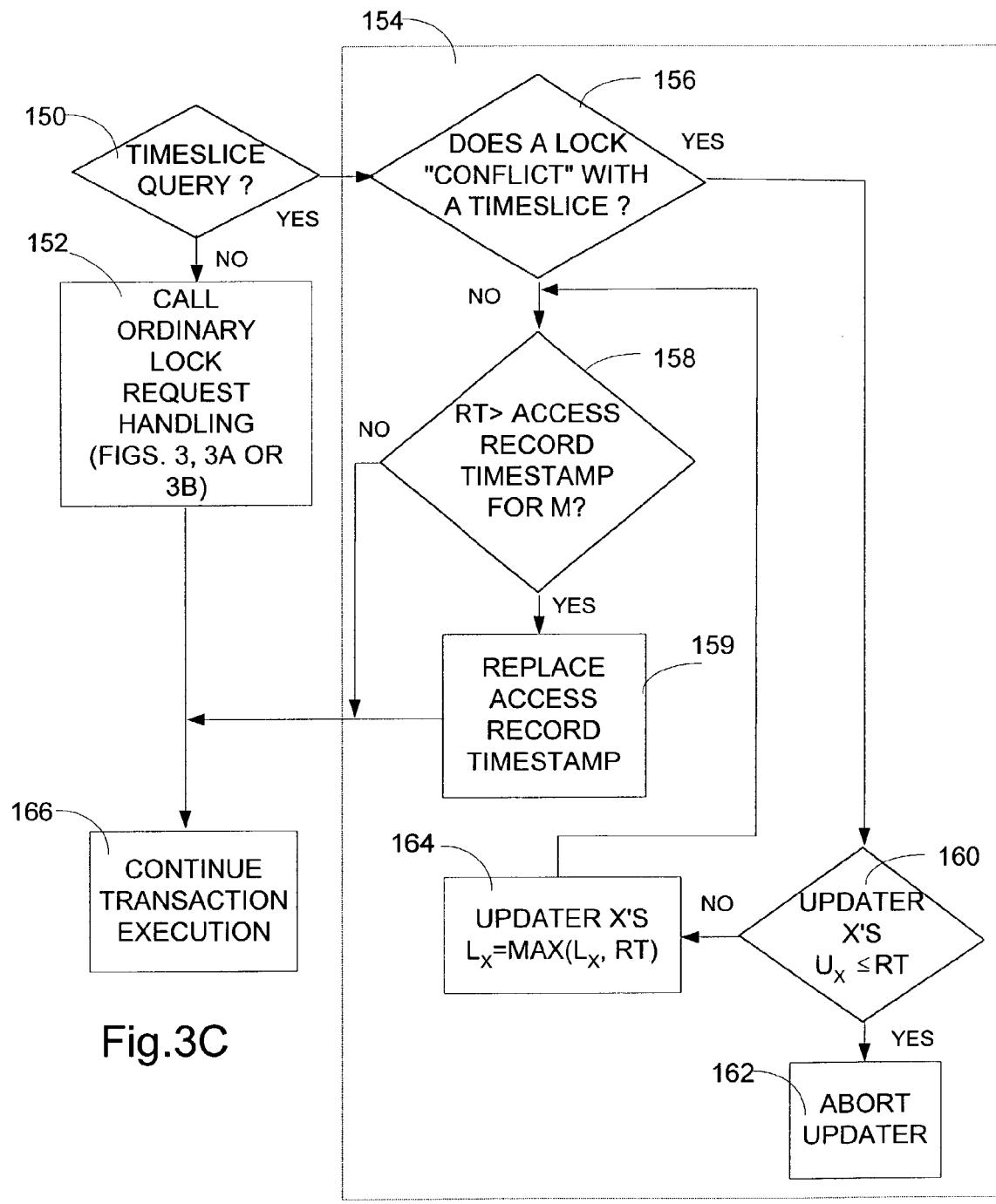
FIG. 3C is a flowchart illustrating processing of timeslice queries.

Referring to FIG. 3C, dealing with the interaction between timeslice queries and updating transactions is done within the lock manager in one embodiment. In this embodiment, the method has timeslice queries access the lock manager as if they were ordinary queries doing ordinary reads. The method determines 150 when a timeslice query occurs so that the lock manager can make appropriate "adjustments" to the locking that it does.

If there is no timeslice query, the method calls the ordinary lock request handling routine of FIG. 3. If there is a timeslice query, the method goes to a timeslice subroutine 154 that makes the "adjustments" to the steps taken by the lock manager for the timeslice query. The timeslice subroutine 154 first determines 156 whether a lock of a concurrently executing transaction conflicts with the timeslice query. If no lock conflicts with the timeslice query, the lock manager updates the S mode column of the access timestamp table ATT immediately with the timeslice query read time RT instead of waiting until commit to update the access timestamp table ATT when presented with a timeslice query. If a lock conflicts with a timeslice query, instead of blocking when encountering a resource that is held in a lock mode that conflicts with a timeslice read, the lock manager permits the read to proceed. The method checks 160 whether the updating transaction's upper bound is less than or equal to the read time RT of the timeslice query. When the conflicting locks are held by "early commit" updating transactions whose upper bounds $U_X$ are earlier than the read time RT of the timeslice query, these updating transactions are aborted 162. If the lower bounds are earlier than the read time, the method sets 164 lower bounds to the read time. However, an updating transaction that can commit later than $t_{cur}$ is not aborted, since read time RT will always be less than $t_{cur}$. Once the lower bound $L_X$ is set, the access record for the resource requested by the timeslice query is updated 159 if the read time RT is later than the timestamp in the access record for R with mode M 158. Transaction execution then continues 166.

Figure 3D:
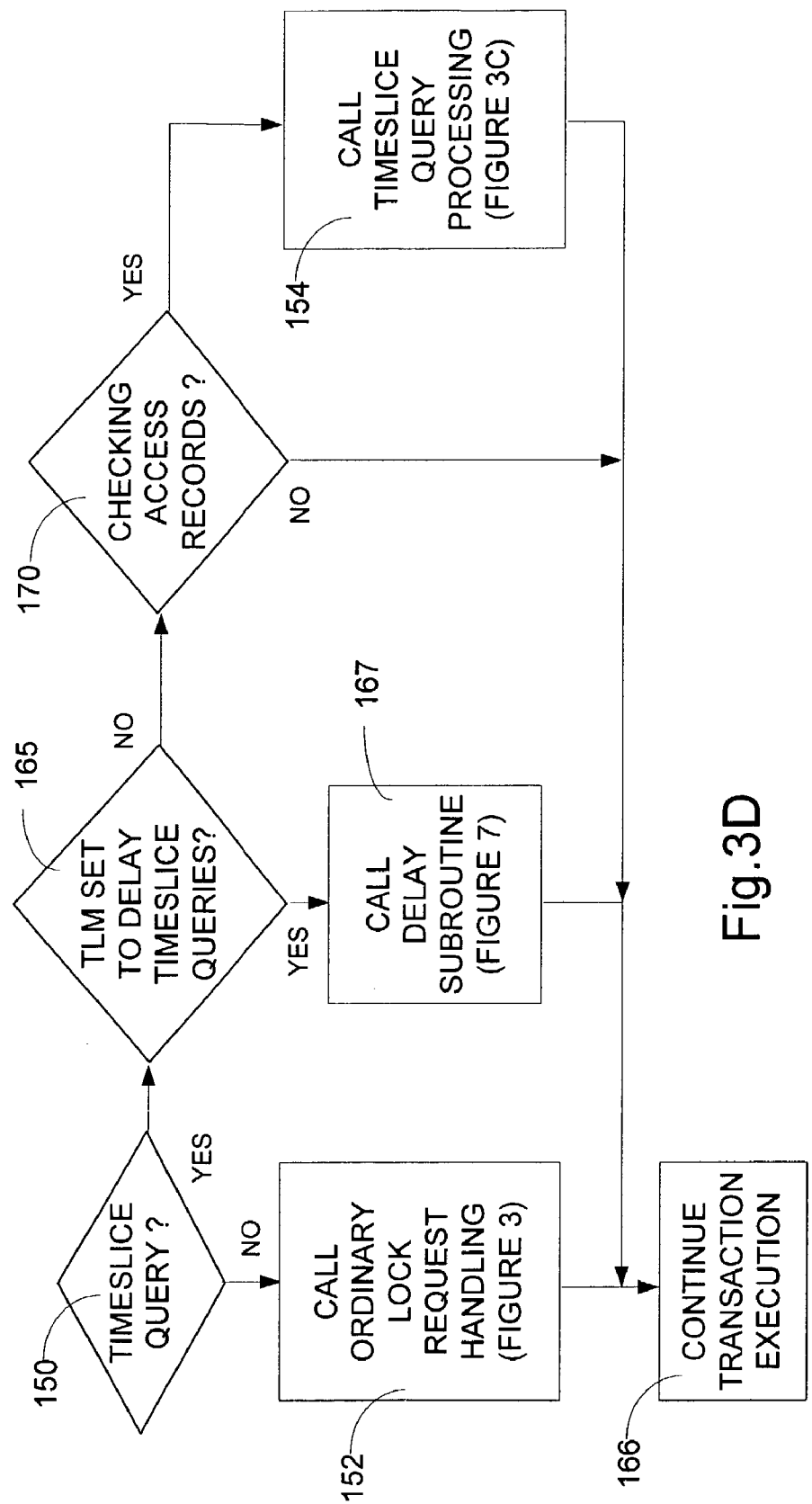
FIG. 3D is a flowchart illustrating processing of timeslice queries in an alternate embodiment.
Figure 7:
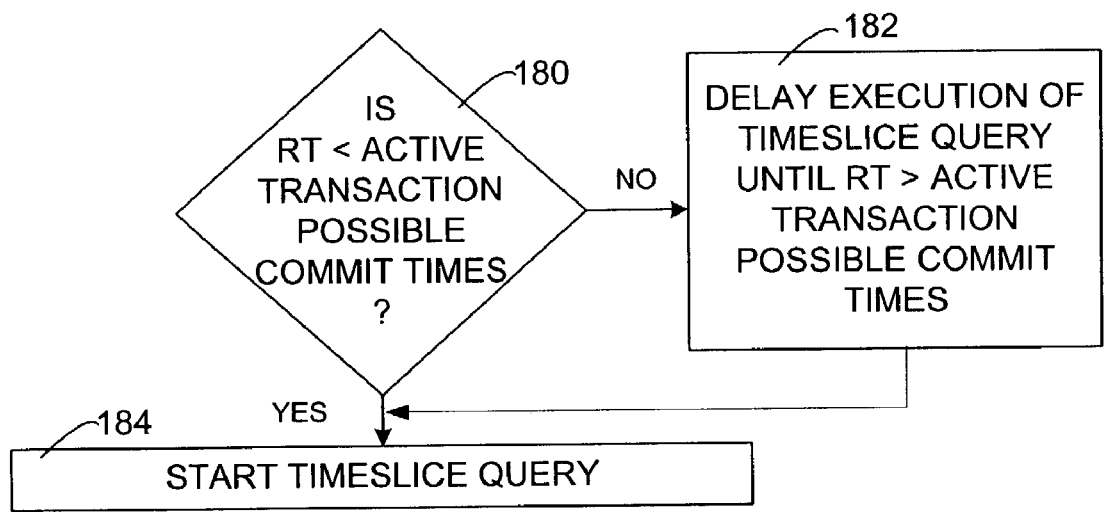
FIG. 7 is a flow chart that illustrates a method delaying execution of timeslice queries.

As is discussed with respect to "normal transactions" the method can avoid the checking and updating described here when CURRENT TIME has not been requested or an upper bound $U_X$ determined by a request for CURRENT time has not been reached. FIG. 3D is an optimized version of FIG. 3C where the timeslice subroutine 154 is bypassed if the timestamping lock manager TLM is set 165 to delay timeslice queries until after active transaction possible commit times or access records are not being checked. If the timeslice queries are being delayed, the delay subroutine illustrated by FIG. 7 is called 167. If the timeslice queries are not being delayed, the timeslice subroutine can still be bypassed if the access records are not being checked. This can be done in "safe" cases. In this embodiment, if there are no "checking" transactions 170, i.e. updating transactions with upper bounds $U_X$ earlier than $t_{cur}$, then no checking of locks or updating of the access timestamp table ATT is required.

The case where the method sees that it is reading a version of the data that is no longer current, may be harder to exploit, since the method's will probably consult the lock manager before examining the versions to be read. As a result, the method may not know if it is reading a version of the data that is no longer current while executing in the lock manager.

In one embodiment, the disclosed method avoids timeslice locking. The method may ensure that timeslice queries neither need to lock the version of the data that they are reading nor abort updaters. Snapshot transactions in existing database systems do not need locking. This is because their read time RT is always earlier than the commit time of any active transaction. Referring to FIG. 7, a global way to exploit this is to ensure that a timeslice query can only start execution when its read time RT is earlier than the commit time of active transactions. The method determines 180 whether the timeslice queries read time is less than the commit time of an active transaction. If the read time RT is greater than the lowest timestamp for active queries, execution of the timeslice query is delayed 182. If the read time RT is less than the lowest timestamp of an active transaction, the method starts 184 executing the timeslice query. If there are no transactions with timestamp upper bounds $U_X$, then this becomes an instance of the conventional snapshot transaction case. If an active transaction has an upper bound, then the requirement becomes that the read time be earlier than the minimum of $t_{cur}$ and that upper bound $U_X$. If this is not the case (i.e. there is an upper bound that is earlier), the method waits for all transactions with upper bounds $U_X$ earlier than the read time requested to commit. This is very close to the timeslice query being blocked by a global lock. If such blocking is rare, this embodiment is a viable way to simplify the system. In one embodiment, snapshot transactions can be employed as a solution when used without CURRENT TIME functionality.

The disclosed method for timestamping works when ordinary data exists, and the data may or may not be accessed with the transaction time database data in the same transaction. The disclosed method keeps the timestamps that are assigned to temporal data consistent with the serialization order of transactions when potentially large numbers of transactions only access ordinary data, but a few access temporal data and some access both kinds of data. Prior solutions do not solve this problem.

The disclosed method recognizes that handling range queries with correct serialization semantics requires that range queries lock more than simply the records read. The disclosed method requires that range queries lock the range involved in the query, so that "phantom" inserts are prevented until the range query completes. The disclosed method uses multi-granularity locking involving both the range as the larger granule, and the record as the smaller granule within the range. The disclosed method exploits multi-granularity resources to solve the phantom problem for efficiency in the same way that they are used for locking.

While the present invention has been described with a degree of particularity, it is the intent that the invention include all modifications and alterations falling within the spirit or scope of the appended claims.

The invention claimed is:

1. For use with a database that includes temporal data, a method of assigning transaction timestamps, comprising:
   a) two-phase locking a resource accessed by a first transaction to prevent conflicts with concurrent transactions;
   b) creating an access record of the two-phase locking and a timestamp of the first transaction for said resource accessed by said first transaction in an access table different from a data table or index thereof for storing external data in the database;
   c) accessing said access record to determine whether the resource that a subsequent transaction accesses conflicts with the resource accessed by said first transaction;
   d) identifying a timestamp lower bound for the subsequent transaction when the subsequent transaction access of the resource conflicts with the resource access by said first transaction, said lower bound being at least greater then said timestamp of the first transaction; and
   e) assigning a timestamp to the subsequent transaction that is greater than said lower bound.

2. The method of claim 1 further comprising determining whether a time function has been requested by said subsequent transaction, setting a timestamp upper bound to an end of an interval determined by the request for current time, and assigning a timestamp to the subsequent transaction that is less than or equal to said upper bound.

3. The method of claim 2 wherein the time function is one of a CURRENT TIME function, a CURRENT DATE function, a CURRENT TIMESTAMP FUNCTION.

4. The method of claim 2 wherein said timestamp of the subsequent transaction is set equal to said upper bound.

5. The method of claim 2 wherein said timestamp of the subsequent transaction is set to the lesser of the commit time of said subsequent transaction and end of said interval defined by the current time request.

6. The method of claim 1 wherein said lower bound is a greater of the timestamp of the first transaction and the beginning of an interval defined by a time function requested by said subsequent transaction.

7. The method of claim 2 further comprising aborting said subsequent transaction when said lower bound is greater than said upper bound.

8. The method of claim 1 wherein said resource comprises one or more of a database record, a database record ID, a table key, and a range of database records.

9. The method of claim 1 wherein said resource accessed by said first transaction is a range of database records.

10. The method of claim 1 further comprising creating an access record of a lock mode and a transaction timestamp each time a resource is accessed.

11. The method of claim 10 further comprising accessing previously created access records of locks and transaction timestamps that conflict with a resource accessed by said subsequent transaction to determine a lower bound for each resource accessed by said subsequent transaction and assigning a largest lower bound of the resources accessed by the subsequent transaction as the lower bound of the timestamp for the subsequent transaction when the largest lower bound is greater than the lower bounds derived from previous requests.

12. The method of claim 1 further comprising replacing the access record of the lock and the timestamp of the first transaction for said resource accessed by said first transaction with an access record of a lock and a timestamp of the subsequent transaction when said resource accessed by said first transaction is accessed by said subsequent transaction with a later timestamp.

13. The method of claim 1 further comprising replacing the access record of the lock and the timestamp of the first transaction for said resource accessed by said first transaction with an access record of a lock and a timestamp of the subsequent transaction when the resource accessed by said subsequent transaction maps to the access record for said resource accessed by said first transaction.

14. The method of claim 1 wherein said database includes temporal and non-temporal data.

15. The method of claim 1 wherein said database includes temporal and non-temporal tables.

16. The method of claim 1 further comprising setting a timestamp upper bound for a timestamp assigned to said subsequent transaction, and assigning a timestamp to the subsequent transaction that is less than or equal to said upper bound.

17. The method of claim 2 wherein said accessing of said access record is delayed until an actual time is greater than the upper bound.

18. The method of claim 1 wherein said access records are created when said first transaction commits.

19. The method of claim 1 wherein said first transaction includes a timeslice query and an access record for a resource accessed by said timeslice query is created when the resource is read.

20. The method of claim 1 wherein said first transaction includes a timeslice query and a lock is not placed on resources accessed by said timeslice query.

21. The method of claim 2 wherein said time interval is the result of a SQL CURRENT TIME request.

22. For use with a database that includes temporal data, a method of assigning a transaction timestamp, comprising:
 a) two-phase locking resources accessed by transactions to prevent conflicts with concurrent transactions;
 b) determining whether a transaction has requested current time, wherein a request for current time defines a time interval;
 c) creating access records of lock modes and timestamps once a transaction requests current time in an access table different from a data table or index thereof that stores external data in the database;
 d) accessing said access record to determine whether a resource that a subsequent transaction accesses conflicts with resources accessed by a prior transaction occurring after the request for current time;
 e) identifying a timestamp lower bound when the subsequent transaction accesses a resource that conflicts with a resource accessed by said prior transaction, said timestamp lower bound being greater than a timestamp associated with a conflicting resource access by said prior transaction;
 f) setting a timestamp upper bound to an end of said interval defined by a current time request; and
 g) assigning a timestamp to the subsequent transaction that is greater than said lower bound and less than or equal to said upper bound.

23. The method of claim 22 wherein said time interval is the result of a SQL CURRENT TIME request.

24. The method of claim 22 further comprising aborting said subsequent transaction when said lower bound is greater than or equal to said upper bound.

25. The method of claim 22 further comprising creating access records of lock modes and timestamps for resources accessed after current time is requested, accessing access records of lock modes and transaction timestamps that conflict with a resource accessed by said subsequent transaction to determine a lower bound for each resource accessed by said subsequent transaction and assigning a largest lower bound of the resources accessed by the subsequent transaction as the lower bound of the timestamp for the subsequent transaction.

26. The method of claim 25 wherein said lower bound is a greater of a largest timestamp of conflicting accesses to resources by the subsequent transaction and the beginning of an interval defined by a CURRENT TIME function requested by said subsequent transaction.

27. The method of claim 25 wherein the time interval is defined by a precision of the current time request.

28. The method of claim 25 wherein said accessing said access record by a transaction is delayed until an actual time is greater than the upper bound.

29. The method of claim 22 wherein said accessing access records of lock modes and transaction timestamps by a transaction is stopped if the transaction has not requested current time.

30. The method of claim 22 wherein said creating and updating of lock mode and timestamp access records is stopped once no active transactions have requested current time.

31. The method of claim 22 wherein said resource accessed by said first transaction is a range of database records.

32. The method of claim 22 further comprising creating an access record of a lock mode and a transaction timestamp each time a resource is accessed.

33. The method of claim 25 further comprising replacing an access record of a lock mode and a timestamp of a given transaction for a resource accessed by said given transaction with an access record of a lock mode and a timestamp of the subsequent transaction when said resource accessed by said given transaction is accessed by said subsequent transaction with a later timestamp.

34. The method of claim 25 further comprising replacing an access record of a lock mode and a timestamp of a given transaction for a resource accessed by said given transaction with an access record of a lock mode and a timestamp of the subsequent transaction when a resource accessed by said subsequent transaction maps to the access record for said resource accessed by said given transaction.

35. The method of claim 22 wherein said database includes temporal and non-temporal data.

36. The method of claim 22 wherein said database includes temporal and non-temporal tables.

37. For use with a database that includes temporal data, a method of assigning transaction timestamps, comprising:

a) placing two phase locking on resources accessed by transactions to prevent conflicts with concurrent transactions;

b) determining whether a transaction has requested current time, wherein a request for current time defines a time interval;

c) entering access records of the lock modes and timestamps into a collection of such records of transactions that commit after a request for current time for resources accessed after the request for current time, the access records entered in an access table different from a data table or index thereof that stores external data in the database;

d) accessing said collection to determine whether resources accessed by a subsequent transaction conflict with resources accessed by previous transactions;

e) identifying a timestamp lower bound for the subsequent transaction when the subsequent transaction accesses a resource that conflicts with a resource accessed by a previous transaction, based on a timestamp of the previous transaction; and f) assigning a timestamp to the subsequent transaction that is greater than said lower bound.

38. The method of claim 37 wherein the time interval is defined by a precision of the current time request.

39. The method of claim 37 wherein said accessing said collection is delayed until an actual time is greater than the upper bound.

40. The method of claim 37 wherein said accessing said collection is stopped once no transactions are requesting current time.

41. The method of claim 37 wherein said entering access records in said collection is stopped once no transactions are requesting current time.

42. The method of claim 37 wherein a access record of a lock mode and a transaction timestamp is entered in said collection each time a resource is accessed.

43. The method of claim 37 further comprising replacing an access record of a lock mode and a timestamp of a given transaction for a resource accessed by said given transaction with an access record of a lock mode and a timestamp of the subsequent transaction when said resource accessed by said given transaction is accessed by said subsequent transaction with a later timestamp.

44. The method of claim 37 further comprising replacing an access record of a lock mode and a timestamp of a given transaction for a resource accessed by said given transaction with an access record of a lock mode and a timestamp of the subsequent transaction when a resource accessed by said subsequent transaction maps to the access record for said resource accessed by said given transaction.

45. A computer readable medium having computer executable instructions stored thereon for performing a method of assigning transaction timestamps for use with a database that includes temporal data, the method comprising:

a) two-phase locking a resource accessed by a first transaction to prevent conflicts with concurrent transactions;

b) creating an access record of the two-phase locking and a timestamp of the first transaction for said resource accessed by said first transaction in an access table different from a data table or index thereof that stores external data in the database;

c) accessing said access record to determine whether the resource that a subsequent transaction accesses conflicts with the resource accessed by said first transaction;

d) identifying a timestamp lower bound for the subsequent transaction when the subsequent transaction access of the resource conflicts with the resource access by said first transaction, said lower bound being at least greater than said timestamp of the first transaction; and e) assigning a timestamp to the subsequent transaction that is greater than said lower bound.

46. The computer readable medium of claim 45 wherein the method further comprises determining whether a CURRENT TIME function has been requested by said subsequent transaction, setting a timestamp upper bound to an end of an interval determined by the request for current time, and assigning a timestamp to the subsequent transaction that is less than or equal to said upper bound.

47. The computer readable medium of claim 46 wherein said timestamp of the subsequent transaction is set equal to said upper bound.

48. The computer readable medium of claim 46 wherein said timestamp of the subsequent transaction is set to the lesser of the commit time of said subsequent transaction and end of said interval defined by the current time request.

49. The computer readable medium of claim 45 wherein said lower bound is a greater of the timestamp of the first transaction and the beginning of an interval defined by a CURRENT TIME function requested by said subsequent transaction.

50. The computer readable medium of claim 46 wherein the method further comprises aborting said subsequent transaction when said lower bound is greater than said upper bound.

51. The computer readable medium of claim 45 wherein said resource comprises one or more of a database record, a database record ID, a table key, and a range of database records.

52. The computer readable medium of claim 45 wherein said resource accessed by said first transaction is a range of database records.

53. The computer readable medium of claim 45 wherein the method further comprises creating an access record of a lock and a transaction timestamp each time a resource is accessed.

54. The computer readable medium of claim 53 wherein the method further comprises accessing previously created access records of locks and transaction timestamps that conflict with a resource accessed by said subsequent transaction to determine a lower bound for each resource accessed by said subsequent transaction and assigning a largest lower bound of the resources accessed by the subsequent transaction as the lower bound of the timestamp for the subsequent transaction when the largest lower bound is greater than the lower bounds derived from previous requests.

55. The computer readable medium of claim 45 wherein the method further comprises replacing the access record of the lock and the timestamp of the first transaction for said resource accessed by said first transaction with an access record of a lock and a timestamp of the subsequent transaction when said resource accessed by said first transaction is accessed by said subsequent transaction with a later timestamp.

56. The computer readable medium of claim 45 wherein the method further comprises replacing the access record of the lock and the timestamp of the first transaction for said resource accessed by said first transaction with an access record of a lock and a timestamp of the subsequent transaction when a resource accessed by said subsequent transaction maps to the access record for said resource accessed by said first transaction.

57. The computer readable medium of claim 45 wherein said database includes temporal and non-temporal data.

58. The computer readable medium of claim 45 wherein the method further comprises setting a timestamp upper bound to a time said subsequent transaction commits, and assigning a timestamp to the subsequent transaction that is less than or equal to said upper bound.

59. The computer readable medium of claim 46 wherein said accessing of said access record is delayed until an actual time is greater than the upper bound.

60. The computer readable medium of claim 45 wherein said access records are created when said first transaction commits.

61. The computer readable medium of claim 45 wherein said first transaction includes a timeslice query and an access records for a resource accessed by said timeslice query is created when the resource is read.

62. The computer readable medium of claim 45 wherein said first transaction includes a timeslice query and a lock is not placed on resources accessed by said timeslice query.

63. A computer readable medium having computer executable instructions stored thereon for performing a method of assigning transaction timestamps for use with a database that includes temporal data, the method comprising:
  a) placing two-phase locking on resources accessed by transactions to prevent conflicts with concurrent transactions;
  b) determining whether a transaction has requested current time, wherein a request for current time defines a time interval;
  c) creating access records of lock modes and timestamps once a transaction requests current time in an access table different from a data table or index thereof that stores external data in the database;
  d) accessing said access record to determine whether a resource that a subsequent transaction accesses conflicts with resources accessed by a prior transaction occurring after the request for current time;
  e) identifying a timestamp lower bound when the subsequent transaction accesses a resource that conflicts with a resource accessed by said prior transaction, said timestamp lower bound being greater than a timestamp associated with a conflicting resource access by said prior transaction;
  f) setting a timestamp upper bound to an end of said interval defined by a current time request; and
  g) assigning a timestamp to the subsequent transaction that is greater than said lower bound and less than or equal to said upper bound.

64. The computer readable medium of claim 63 wherein the method further comprises creating access records of lock modes and timestamps for resources accessed after current time is requested, accessing access records of lock modes and transaction timestamps that potentially conflict with a resource accessed by said subsequent transaction to determine a lower bound for each resource accessed by said subsequent transaction and assigning a largest lower bound of the resources accessed by the subsequent transaction as the lower bound of the timestamp for the subsequent transaction.

65. The computer readable medium of claim 63 wherein said lower bound is a greater of a largest lower bound of the resources accessed by the subsequent transaction and an actual time current time is requested by said subsequent transaction.

66. The computer readable medium of claim 63 wherein the time interval is defined by a precision of the current time request.

67. The computer readable medium of claim 64 wherein said accessing said access record by a transaction is delayed until an actual time is greater than the upper bound.

68. The computer readable medium of claim 60 wherein said accessing access records of lock modes and transaction timestamps by a transaction is stopped if the transaction has not requested current time.

69. The computer readable medium of claim 63 wherein said creating and updating of lock mode and timestamp access records is stopped once no active transactions have requested current time.

70. A computer readable medium having computer executable instructions stored thereon for performing a method of assigning transaction timestamps for use with a database that includes temporal data, the method comprising:
  a) placing two phase locking on resources accessed by transactions to prevent conflicts with concurrent transactions;
  b) determining whether a transaction has requested current time, wherein a request for current time defines a time interval;
  c) entering access records of the lock modes and timestamps into a collection of such records of transactions that commit after a request for current time for resources accessed after the request for current time, the access records entered in an access table different from a data table or index thereof that stores external data in the database;
  d) accessing said collection to determine whether resources accessed by a subsequent transaction conflict with resources accessed by previous transactions;
  e) identifying a timestamp lower bound for the subsequent transaction when the subsequent transaction accesses a resource that conflicts with a resource accessed by a previous transaction, based on a timestamp of the previous transaction; and
  f) assigning a timestamp to the subsequent transaction that is greater than said lower bound.

* * * * *